United States Patent
Liu et al.

(10) Patent No.: US 12,457,412 B2
(45) Date of Patent: Oct. 28, 2025

(54) PHOTOGRAPHING PROCESSING METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Xianliang Liu, Guangdong (CN); Liuqing Gong, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 253 days.

(21) Appl. No.: 18/308,638

(22) Filed: Apr. 27, 2023

(65) Prior Publication Data
US 2023/0269459 A1    Aug. 24, 2023

Related U.S. Application Data

(63) Continuation of application No. PCT/CN2021/125176, filed on Oct. 21, 2021.

(30) Foreign Application Priority Data

Oct. 28, 2020 (CN) .......................... 202011177119.8

(51) Int. Cl.
*H04N 23/63* (2023.01)
*H04N 23/62* (2023.01)
*H04N 23/67* (2023.01)

(52) U.S. Cl.
CPC ........... *H04N 23/632* (2023.01); *H04N 23/62* (2023.01); *H04N 23/635* (2023.01); *H04N 23/67* (2023.01)

(58) Field of Classification Search
CPC .... H04N 23/62; H04N 23/632; H04N 23/635; H04N 23/67; H04N 23/675
See application file for complete search history.

(56) References Cited

U.S. PATENT DOCUMENTS

2010/0062803 A1*  3/2010  Yun ..................... H04N 23/62
                                                      455/556.1
2012/0281132 A1   11/2012  Ogura et al.
(Continued)

FOREIGN PATENT DOCUMENTS

CN    103813098 A    5/2014
CN    105450921 A    3/2016
(Continued)

OTHER PUBLICATIONS

Extended European Search Report for Application No. 21885011.3 dated Feb. 28, 2024, 7 Pages.
(Continued)

*Primary Examiner* — Lin Ye
*Assistant Examiner* — Chriss S Yoder, III
(74) *Attorney, Agent, or Firm* — BROOKS KUSHMAN P.C.

(57) ABSTRACT

A photographing processing method and apparatus, an electronic device, and a readable storage medium, and pertains to the field of photographing technologies. The photographing processing method includes: performing automatic focus on a first preview image displayed on a photographing preview interface, to obtain first focusing information, and updating the first preview image to a second preview image corresponding to the first focusing information; receiving a first input; in response to the first input, adjusting the first focusing information to obtain second focusing information, and updating the second preview image to a third preview image corresponding to the second focusing information; and performing photographing on the third preview image according to the second focusing information.

18 Claims, 13 Drawing Sheets

(56) References Cited

U.S. PATENT DOCUMENTS

| | | | |
|---|---|---|---|
| 2013/0242136 A1 | 9/2013 | Chen | |
| 2013/0278809 A1* | 10/2013 | Itoh | G02B 7/38 |
| | | | 348/333.01 |
| 2014/0139721 A1 | 5/2014 | Choi | |
| 2016/0044234 A1* | 2/2016 | Huang | H04N 23/632 |
| | | | 348/222.1 |

FOREIGN PATENT DOCUMENTS

| | | |
|---|---|---|
| CN | 106937056 A | 7/2017 |
| CN | 107087102 A | 8/2017 |
| CN | 107483825 A | 12/2017 |
| CN | 110166692 A | 8/2019 |
| CN | 110460771 A | 11/2019 |
| CN | 112312016 A | 2/2021 |
| JP | 2012145813 A | 8/2012 |
| JP | 2015065616 A | 4/2015 |

OTHER PUBLICATIONS

First Office Action for Japanse Application No. 2023-523587, dated Mar. 28, 2024, 4 Pages.
First Office Action for Chinese Application No. 202011177119.8, dated Aug. 16, 2021, 11 Pages.
International Search Report and Written Opinion for Application No. PCT/CN2021/125176 dated Jan. 19, 2022, 8 Pages.

* cited by examiner

PHOTOGRAPHING PROCESSING METHOD AND APPARATUS, ELECTRONIC DEVICE, AND READABLE STORAGE MEDIUM

CROSS-REFERENCE TO RELATED APPLICATIONS

This application is a continuation of International Application No. PCT/CN2021/125176 filed on Oct. 21, 2021, which claims priority to Chinese Patent Application No. 202011177119.8, filed on Oct. 28, 2020, which are incorporated herein by reference in their entireties.

TECHNICAL FIELD

This application pertains to the field of photographing technologies, and in particular, to a photographing processing method, a photographing processing apparatus, an electronic device, and a readable storage medium.

BACKGROUND

In the related art, during photographing, a mobile terminal generally performs focusing through automatic focus. In some specific scenarios, automatic focus deviates from an actual requirement of a user, and even repeated automatic focus fails to meet the user's focusing requirement.

Manual focus can only be used in a "professional mode". In addition, operations are cumbersome, and therefore a focusing speed is significantly slowed down.

SUMMARY

Embodiments of this application aim to provide a photographing processing method and apparatus, an electronic device, and a readable storage medium.

To resolve the foregoing technical problem, this application is implemented as follows:

According to a first aspect, an embodiment of this application provides a photographing processing method. The method includes:

performing automatic focus on a first preview image displayed on a photographing preview interface, to obtain first focusing information, and updating the first preview image to a second preview image corresponding to the first focusing information;

receiving a first input;

in response to the first input, adjusting the first focusing information to obtain second focusing information, and updating the second preview image to a third preview image corresponding to the second focusing information; and performing photographing on the third preview image according to the second focusing information.

According to a second aspect, an embodiment of this application provides a photographing processing apparatus. The photographing processing apparatus includes:

a focusing module, configured to: perform automatic focus on a first preview image displayed on a photographing preview interface, to obtain first focusing information, and update the first preview image to a second preview image corresponding to the first focusing information;

a receiving module, configured to receive a first input;

an adjustment module, configured to: in response to the first input, adjust the first focusing information to obtain second focusing information, and update the second preview image to a third preview image corresponding to the second focusing information; and a photographing module, configured to perform photographing on the third preview image according to the second focusing information.

According to a third aspect, an embodiment of this application provides an electronic device. The electronic device includes a processor, a memory, and a program or an instruction that is stored in the provided memory and that can be run on the provided processor, where the provided program or instruction is executed by the provided processor to implement the steps of the photographing processing method in the first aspect.

According to a fourth aspect, an embodiment of this application provides a readable storage medium. The provided readable storage medium stores a program or an instruction, and the provided program or instruction is executed by a processor to implement the steps of the photographing processing method in the first aspect.

According to a fifth aspect, an embodiment of this application provides a chip. The provided chip includes a processor and a communications interface, the provided communications interface is coupled to the provided processor, and the provided processor is configured to run a program or an instruction to implement the steps of the photographing processing method in the first aspect.

According to a sixth aspect, an embodiment of this application provides an electronic device, where the electronic device is configured to perform the steps of the photographing processing method in the first aspect.

According to a seventh aspect, an embodiment of this application provides a computer program product, where the computer program product may be executed by a processor to implement the steps of the photographing processing method provided in the first aspect.

In the embodiments of this application, after a photographing function (mode) is entered, automatic focus is first performed on a first preview image displayed on a photographing preview interface, to ensure a focusing speed. After the automatic focus is completed, a preview image after the automatic focus is displayed, so that a user previews a focusing result.

If the user finds that the focusing result of the automatic focus cannot meet a focusing requirement, the user may perform, through a focusing adjustment operation, fine tuning on a focal length on the basis of first focusing information obtained through the automatic focus, and synchronously display a preview image obtained after the fine tuning on the focal length. When a fine-tuning result meets the focusing requirement of the user, the user may control, through a first photographing operation according to current second focal length information after the fine tuning, a camera to perform photographing.

Automatic focus is performed first, and focal length information of a to-be-photographed object can be quickly obtained through the automatic focus, to meet a requirement for fast focusing during photographing of a mobile terminal. In addition, the user is allowed to perform fine tuning based on the automatic focus through a focusing adjustment operation, to accurately obtain a focusing result desired by the user. In this way, not only a focusing speed is ensured, but also a focusing result can meet the user's requirement.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that the terms used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

With reference to the accompanying drawings, a photographing processing method, a photographing processing apparatus, an electronic device, and a readable storage medium provided in the embodiments of this application are described in detail by using specific embodiments and application scenarios.

Figure 1:
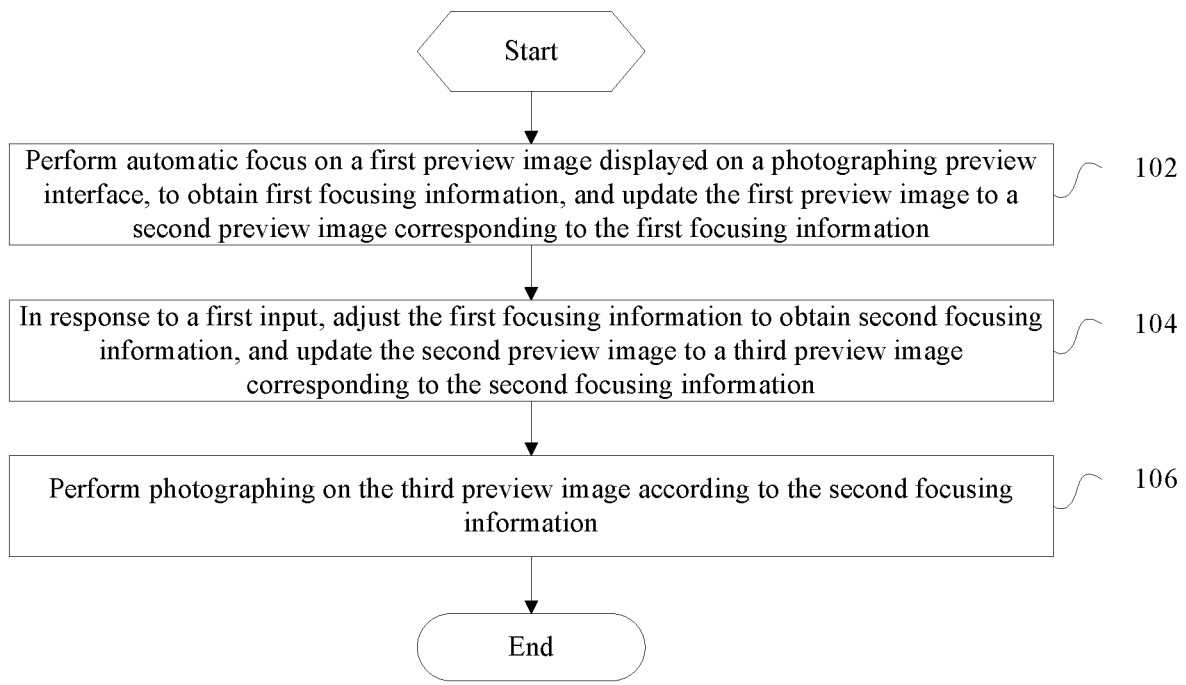
FIG. 1 is a first flowchart of a photographing processing method according to an embodiment of this application.

In some embodiments of this application, FIG. 1 is a first flowchart of a photographing processing method according to an embodiment of this application. Specifically, the photographing processing method specifically includes the following steps:

Step 102: Perform automatic focus on a first preview image displayed on a photographing preview interface, to obtain first focusing information, and update the first preview image to a second preview image corresponding to the first focusing information.

Step 104: Receive a first input, and in response to the first input, adjust the first focusing information to obtain second focusing information, and update the second preview image to a third preview image corresponding to the second focusing information.

Step 106: Perform photographing on the third preview image according to the second focusing information.

In this embodiment of this application, after a photographing mode is entered, automatic focus is first performed on the first preview image displayed on the photographing preview interface, to obtain the first focusing information through the automatic focus, and the first preview image on the photographing preview interface is updated to the second preview image corresponding to the first focusing information.

The first focusing information includes a focus, a focus region, a focal section parameter, and a focal length parameter. In some implementations, the focusing information may further include an ISO (International Standardization Organization, sensitivity defined by International Standardization Organization) value, a white balance parameter, a contrast parameter, color space, and the like.

After the first focusing information of the automatic focus is obtained, if the first input is received, the first focusing information obtained through the automatic focus is adjusted according to a focusing adjustment operation, until a focusing effect meets a user's requirement. The adjusted second focusing information is obtained, and the third preview image displayed based on the second focusing information is displayed, so that the user determines, in real time, whether the required focusing effect is achieved.

The first input is an input used to trigger an electronic device to perform focusing adjustment processing. The first input may be a manual input of the user, for example, pressing a button or touching a screen, or may be an input obtained through a network connection, for example, a signal input from a remote control or the Internet. A specific form of the first input is not limited in this application.

When the user determines that the current focusing effect meets the expectation, the user may press a photo button to control a mobile terminal to perform photographing according to current focusing information to obtain a photo that meets the user's requirement.

In this embodiment of this application, automatic focus is performed first, and focal length information of a to-be-photographed object can be quickly obtained through the automatic focus, to meet a fast focusing requirement during photographing of a mobile end. In addition, the user is allowed to perform fine tuning based on the automatic focus through a focusing adjustment operation, to accurately obtain a focusing result desired by the user. In this way, not only a focusing speed is ensured, but also a focusing result can meet the user's requirement.

Figure 2:
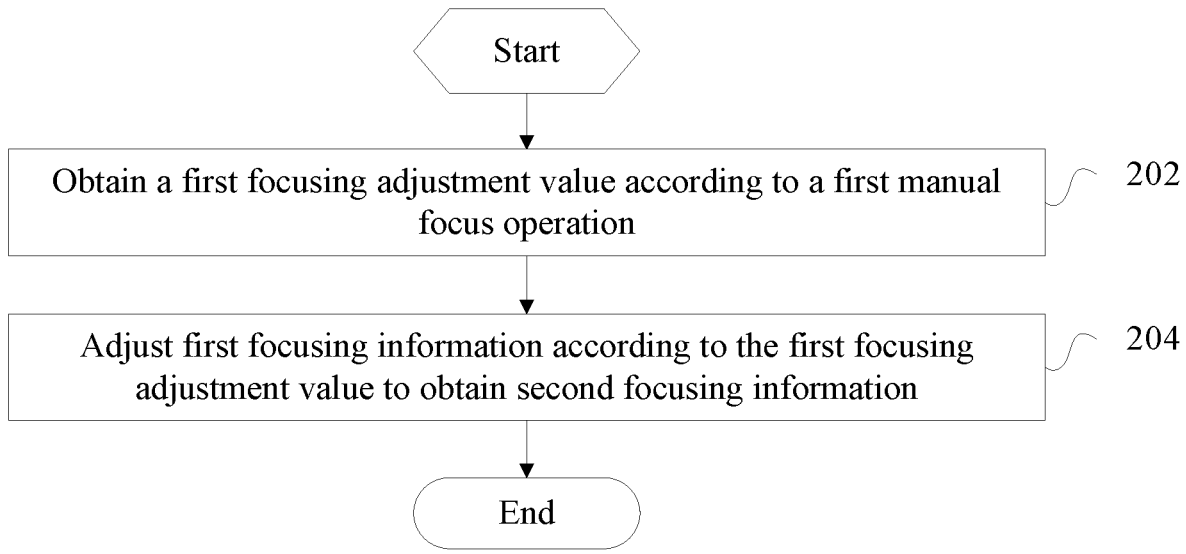
FIG. 2 is a second flowchart of a photographing processing method according to an embodiment of this application.

In some embodiments of this application, FIG. 2 is a second flowchart of a photographing processing method according to an embodiment of this application. Specifically, the first input includes a first manual focus operation, and a process of adjusting the first focusing information specifically includes the following steps:

Step 202: Obtain a first focusing adjustment value according to the first manual focus operation.

Step 204: Adjust the first focusing information according to the first focusing adjustment value to obtain the second focusing information.

In this embodiment of this application, when adjusting the first focusing information obtained through the automatic focus, the user may manually adjust the first focusing information by inputting the first manual focus operation.

Figure 3:
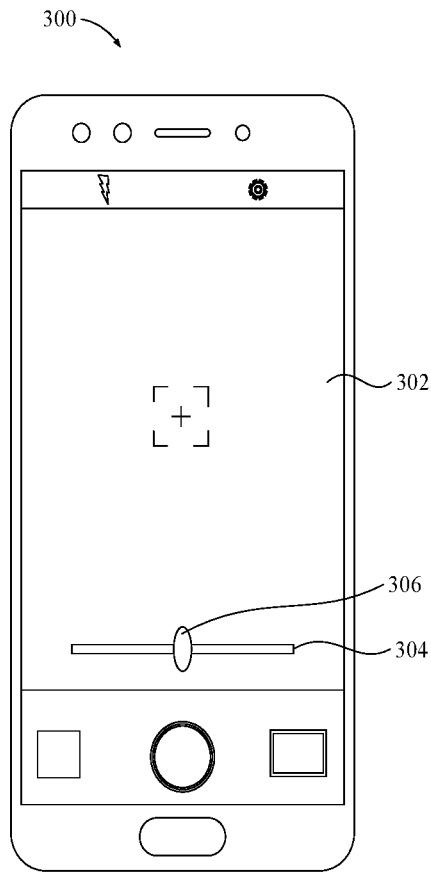
FIG. 3 is a first schematic diagram of a photographing interface according to an embodiment of this application.

Specifically, FIG. 3 is a first schematic diagram of a photographing interface according to an embodiment of this application. As shown in FIG. 3, for a photographing function of a mobile phone 300, after automatic focus succeeds, a focal length adjustment bar 304 and a slider 306 used to indicate a current focal length location are displayed on a preview interface 302.

After the automatic focus succeeds, an initial location of the slider 306 may be in a middle location of the focal length adjustment bar 304.

When the user feels that the result of the current automatic focus does not meet the requirement, the first manual focus operation may be input by touching and "dragging" the slider 306, where a direction of dragging the slider 306 corresponds to increasing or decreasing a focal length, that is, the first focusing adjustment value is positive or negative. A sliding distance of dragging the slider 306 corresponds to a magnitude of the first focusing adjustment value. Finally, the first focusing information obtained through the automatic focus is adjusted according to the determined first focusing adjustment value, to obtain the second focusing information that can meet the user's requirement, and finally obtain a photo that satisfies the user.

This process is based on the almost correct focusing information obtained through the automatic focus, and the user performs manual adjustment. Therefore, focusing accuracy can be improved while ensuring the focusing speed.

Figure 4:
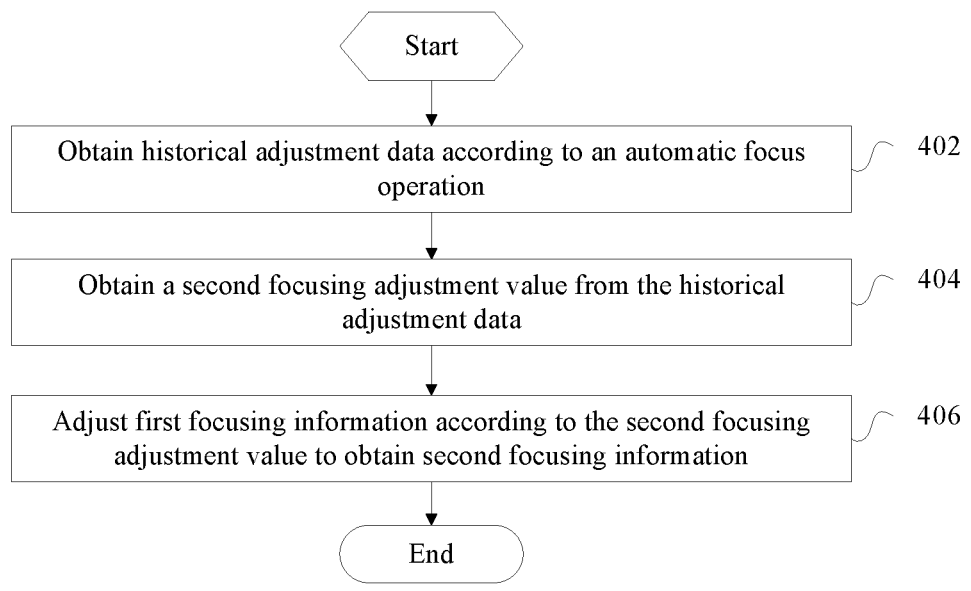
FIG. 4 is a third flowchart of a photographing processing method according to an embodiment of this application.

In some embodiments of this application, FIG. 4 is a third flowchart of a photographing processing method according to an embodiment of this application. Specifically, the first input further includes an automatic focus operation, and a process of adjusting the first focusing information specifically includes the following steps:

Step 402: Obtain historical adjustment data according to the automatic focus operation.

Step 404: Obtain a second focusing adjustment value corresponding to the first focusing information from the historical adjustment data.

Step 406: Adjust the first focusing information according to the second focusing adjustment value to obtain the second focusing information.

In this embodiment of this application, when adjusting the first focusing information obtained through the automatic focus, the user may automatically adjust the first focusing information again by inputting the automatic focus operation.

Figure 5:
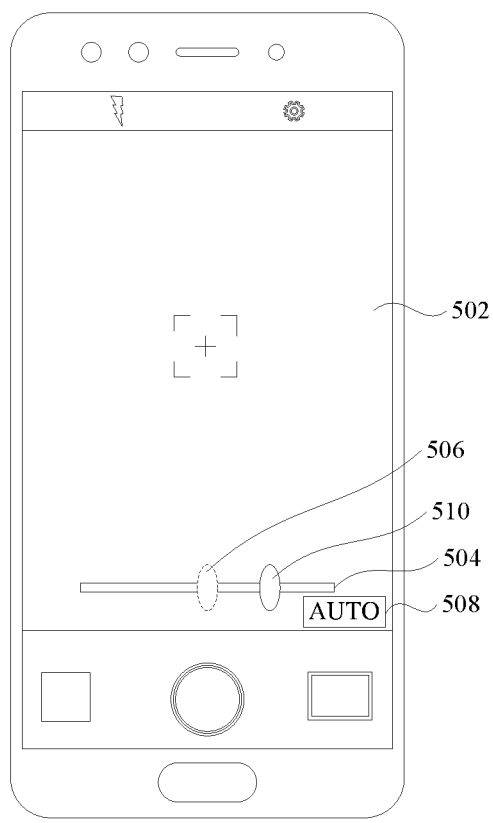
FIG. 5 is a second schematic diagram of a photographing interface according to an embodiment of this application.

Specifically, FIG. 5 is a second schematic diagram of a photographing interface according to an embodiment of this application. As shown in FIG. 5, for a photographing function of a mobile phone, after automatic focus succeeds, a focal length adjustment bar 504, a slider 506 used to indicate an original focal length location, and an automatic adjustment identifier 508 are displayed on a preview interface 502.

After the first time of automatic focus is completed, if the user is not satisfied with the current first focusing information, the automatic focus operation is input by touching the automatic adjustment identifier. In this case, a mobile photographing end obtains historical adjustment data, where the historical adjustment data includes final focusing adjustment data in each previous successful photographing operation process.

The mobile photographing end searches the historical adjustment data for a history record that matches the first focusing information of the current automatic focus result, determines the corresponding second focusing adjustment value, and automatically adjusts the first focusing information by using the second focusing adjustment value, to obtain the adjusted second focusing information for previewing by the user.

For example, when the user performs a plurality of times of photographing on a focal length f1 and a focal length f2, and separately calculates average focusing adjustment values a1 and a2 of manual focus adjustment by the user in the case of the focal length f1 and the focal length f2. Then, when a focal length is f between f1 and f2, a relationship between f and a corresponding adjustment value a is calculated through curve fitting, and the result of the automatic focus is adjusted by using the adjustment value a.

As shown in FIG. 5, after automatic adjustment, both the slider 506 indicating the original focal length location and the slider 510 indicating the current focal length location are displayed on the focal length adjustment bar 504.

It can be understood that if the user is still not satisfied with the adjusted preview image, the automatic focus operation may be repeatedly input, so that the mobile terminal continues to perform adjustment based on the current focusing information until a focusing result can be satisfied by the user.

The historical adjustment data may be local data, or may be big data obtained from a server. A source of the historical adjustment data is not limited in this embodiment of this application.

Figure 6:
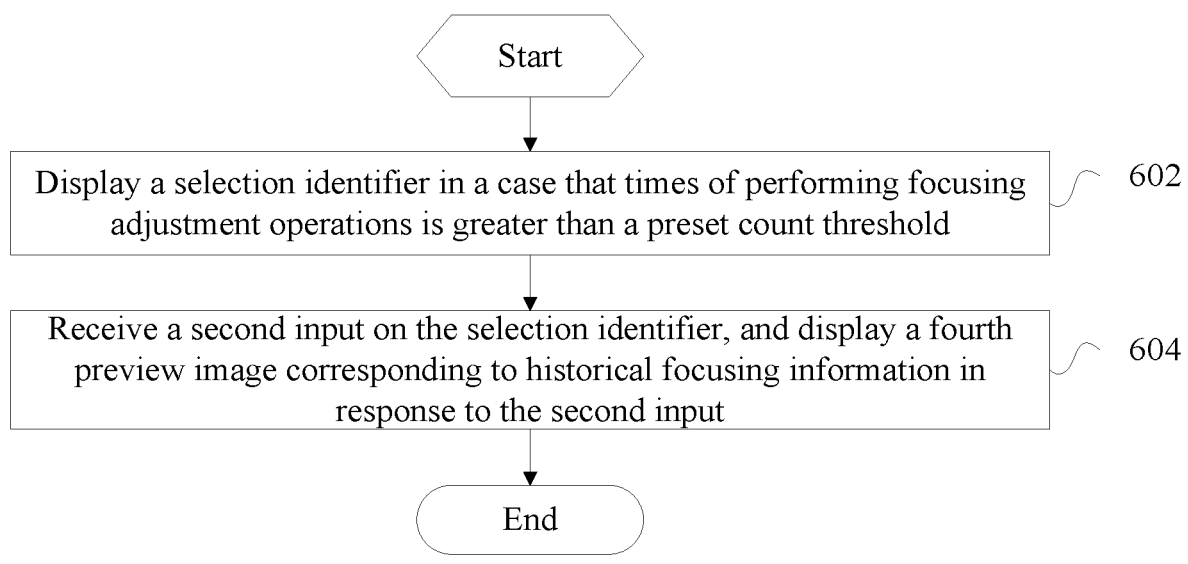
FIG. 6 is a fourth flowchart of a photographing processing method according to an embodiment of this application.

In some embodiments of this application, FIG. 6 is a fourth flowchart of a photographing processing method according to an embodiment of this application. Specifically, the photographing processing method may further include the following steps:

Step 602: Display a selection identifier in a case that times of performing focusing adjustment operations is greater than a preset count threshold.

Step 604: Receive a second input on the selection identifier, and display a fourth preview image corresponding to historical focusing information in response to the second input.

The historical focusing information is associated with the selection identifier.

In this embodiment of this application, after each focusing, if the device determines that the current focusing succeeds, current focusing data is recorded, and stored as historical focusing data. In addition, if the terminal determines that the user currently performs focusing adjustment operations many times, specifically, the obtained times of performing the focusing adjustment operation is greater than the preset count threshold, it is considered that accurate focusing is not implemented after the user adjusts focusing information. In this case, to help the user quickly find an accurate focusing segment, one selection identifier may be displayed. The user selects the selection identifier, so that the focusing can be returned to the historical focusing information, and the fourth preview image corresponding to the historical focusing information is displayed.

In an implementation, the historical focusing information includes a plurality of pieces of focusing information, and the selection identifier may include two page flip keys, which are respectively corresponding to one "previous" piece of historical focusing information and one "next" piece of historical focusing information. After pressing a page flip key "previous", the user selects one piece of historical focusing information of earlier time. After pressing a page flip key "next", the user selects one piece of historical focusing information of later time.

In another implementation, the historical focusing information may be historical focusing information obtained through automatic focus, that is, the first focusing information, and the selection identifier may be an identifier "Back". After triggering the identifier "Back", the user directly returns the historical focusing information obtained through automatic focus, that is, the first focusing information.

Figure 7:
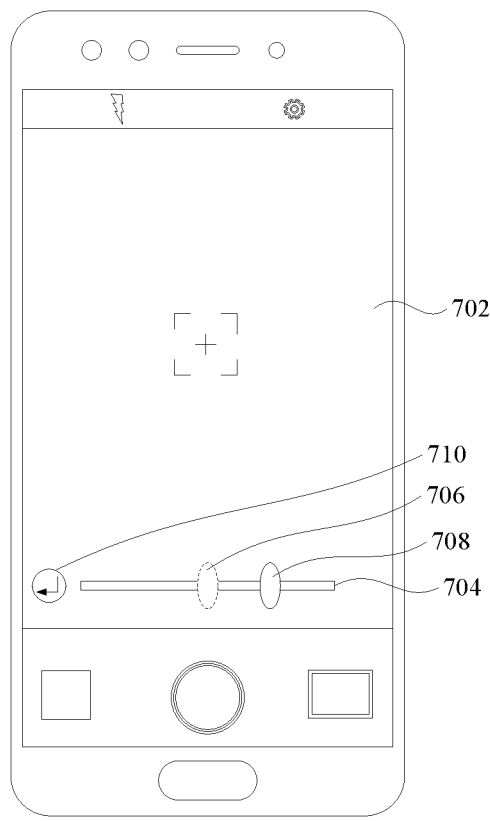
FIG. 7 is a third schematic diagram of a photographing interface according to an embodiment of this application.

Specifically, FIG. 7 is a third schematic diagram of a photographing interface according to an embodiment of this application. As shown in FIG. 7, for a photographing function of a mobile phone, after automatic focus succeeds, a focal length adjustment bar 704, a slider 706 used to indicate an original focal length location, and a slider 708 used to indicate a current focal length location are displayed on a preview interface 702.

If a system determines that the user adjusts focusing information many times, a selection identifier 710 is displayed on a side of the focal length adjustment bar 704. When the user taps the selection identifier 710, current focusing information is returned to historical success focusing information of previous successful focusing.

The historical success focusing information is stored, and the user is allowed to replace the current focusing information with the historical success focusing information by touching the selection identifier. In this way, the user can be prevented from losing correct focusing due to misoperation, and focusing efficiency can be further improved.

Figure 8:
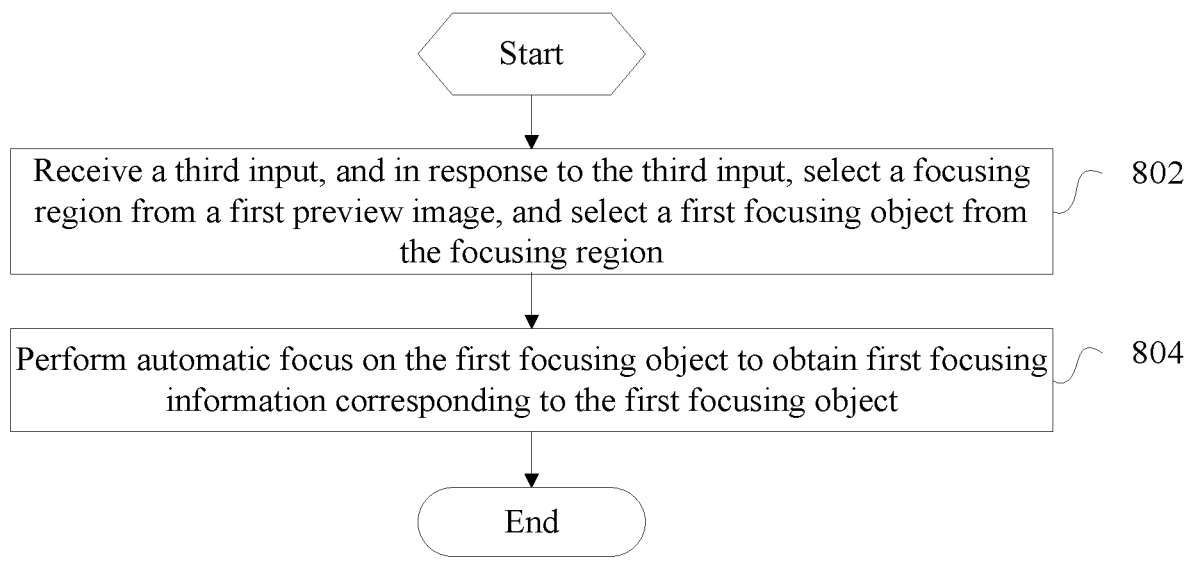
FIG. 8 is a fifth flowchart of a photographing processing method according to an embodiment of this application.

In some embodiments of this application, FIG. 8 is a fifth flowchart of a photographing processing method according to an embodiment of this application. Specifically, before the performing automatic focus on a first preview image displayed on a photographing preview interface, the photographing processing method may further include the following steps:

Step 802: Receive a third input, and in response to the third input, select a focusing region from the first preview image, and select a first focusing object from the focusing region.

Step 804: Perform the automatic focus on the first focusing object to obtain the first focusing information corresponding to the first focusing object.

In this embodiment of this application, before photographing is performed, the user may manually or automatically select a focusing region from a current preview image through the third input. A photographing device may determine a central target according to the focusing region as a focusing target, that is, the first focusing object, and perform the automatic focus by using the first focusing object as a focus.

Specifically, after the user opens a photographing program and enters a photographing interface, a preview image is displayed on a display of a mobile photographing device in real time. The user may select a region from the preview image by tapping a region of the preview image, or in a "box select" manner, to input a first focusing operation. In this case, the mobile photographing device automatically determines one first focusing object in the focusing region as a focusing center target, and performs automatic focus on the first focusing object.

When the first focusing object in the focusing region is being identified, a target closest to a lens in the focusing region may be used as the first focusing object, a target that occupies a maximum area in the focusing region may be used as the first focusing object, or a target that has a maximum brightness in the focusing region may be used as the first focusing object. A method for identifying the first focusing object is not limited in this embodiment of this application.

Figure 9:
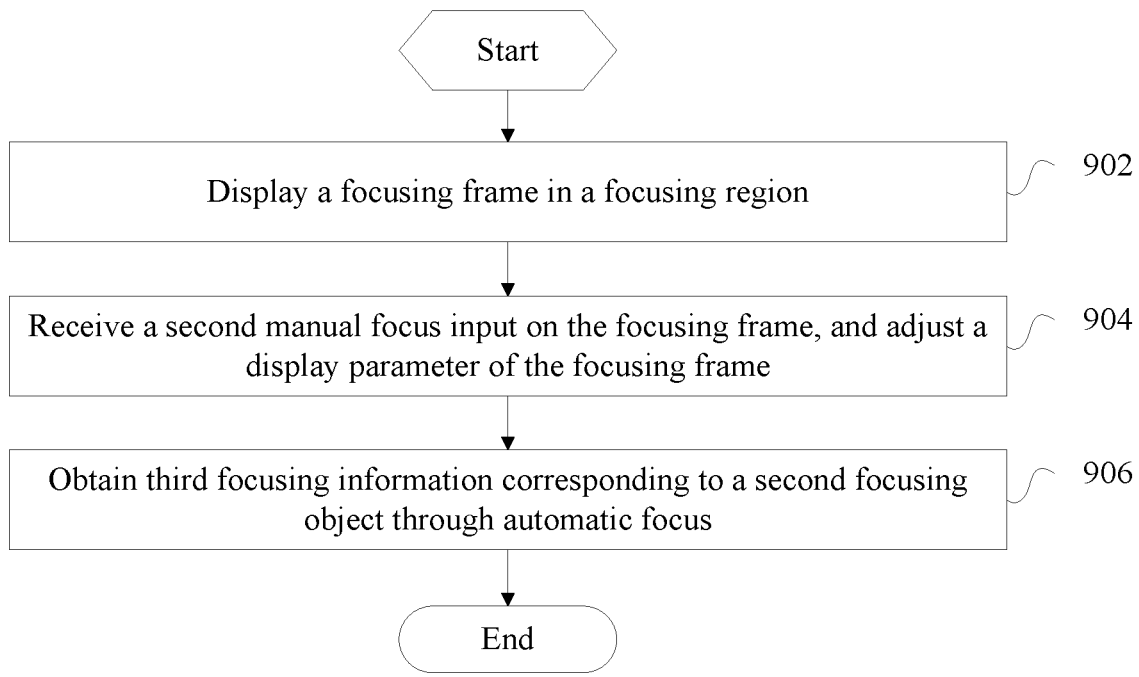
FIG. 9 is a sixth flowchart of a photographing processing method according to an embodiment of this application.

In some embodiments of this application, FIG. 9 is a sixth flowchart of a photographing processing method according to an embodiment of this application. Specifically, after the receiving a third input, the photographing processing method may further include the following steps:

Step 902: Display a focusing frame in the focusing region.

Step 904: Receive a second manual focus input on the focusing frame, and adjust a display parameter of the focusing frame.

Step 906: Obtain third focusing information corresponding to a second focusing object through the automatic focus.

The display parameter of the focusing region includes at least one of a size and a location of a focusing frame, and the second focusing object is an object selected by the focusing frame after the display parameter of the focusing frame is adjusted.

In this embodiment of this application, after the user taps or selects the preview image and selects the focusing region from the current preview image, the focusing frame is displayed in the focusing region. The focusing frame may be a rectangular focusing frame, a circular focusing frame, or a focusing frame of an irregular geometric image. An appearance of the focusing frame is not limited in this embodiment of this application.

After the focusing frame is displayed, a second manual focus operation may be received by using the focusing frame, and a size or a location of the focusing region is adjusted, to determine a "larger" or "smaller" focusing region in the current preview image, or select another location of the current preview image as the focusing region.

After the focusing region changes, the mobile photographing device determines the second focusing object from the changed focusing region. The second focusing object may be a same object as the first focusing object, may be another object different from the first focusing object, or may be another part of the first focusing object.

Figure 10:
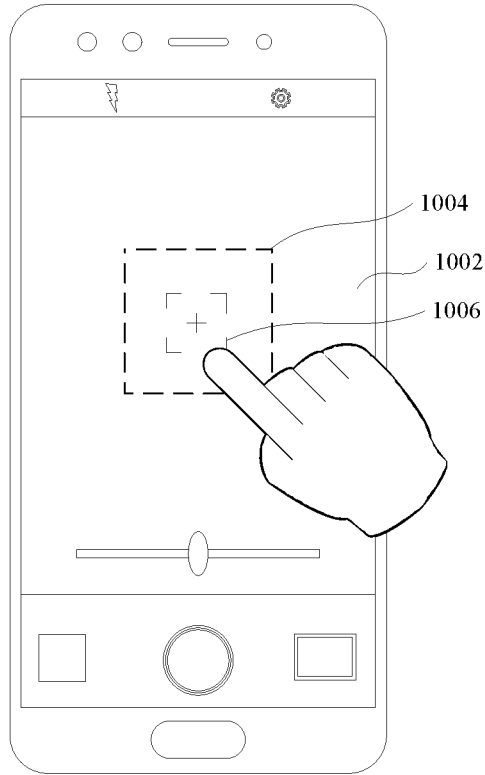
FIG. 10 is a fourth schematic diagram of a photographing interface according to an embodiment of this application.

Specifically, FIG. 10 is a fourth schematic diagram of a photographing interface according to an embodiment of this application. As shown in FIG. 10, after a user opens a photographing program and enters a photographing interface, a mobile phone displays a preview image in real time. The user may input the first focusing operation by tapping any region in a preview image 1002. In this case, a focusing frame 1006 is displayed in a focusing region 1004 that the user taps.

In this case, the user may drag a border portion of the focusing frame 1006 to input the second manual focus operation, and determine a new focusing region 1004 from the preview image 1002.

The user may further drag four corners of the focusing frame 1006 to input the second manual focus operation, or input the second manual focus operation by using a gesture operation such as two-finger extension, to adjust a size of the focusing region 1004.

Optionally, after the user inputs the second manual focus operation, a selection identifier key may further be displayed on the preview image 1002. After the user taps the selection identifier key, the focusing frame returns to an initial state before adjustment of the user.

For example, if a current focusing object A is surrounded by another object, and a distance between the focusing object A and a lens is farther than that from the foregoing another object, a case that a focal length drifts to other objects B and C may occur when the object A is focused. In this case, the focusing adjustment operation may be enabled in a manner of tapping a focusing slider and quickly sliding up.

In this case, a color of the focusing frame may change a display color, such as changing from blue to green.

Therefore, the user may reduce the focusing region by pinching two fingers on the preview image, thereby implementing precise focusing on the object A. The focusing region may be expanded by separating two fingers, to encompass a larger focusing range. In this way, the user can freely select a focusing region and a focusing object, so that a photographing operation can be facilitated and focusing accuracy can be improved.

Figure 11:
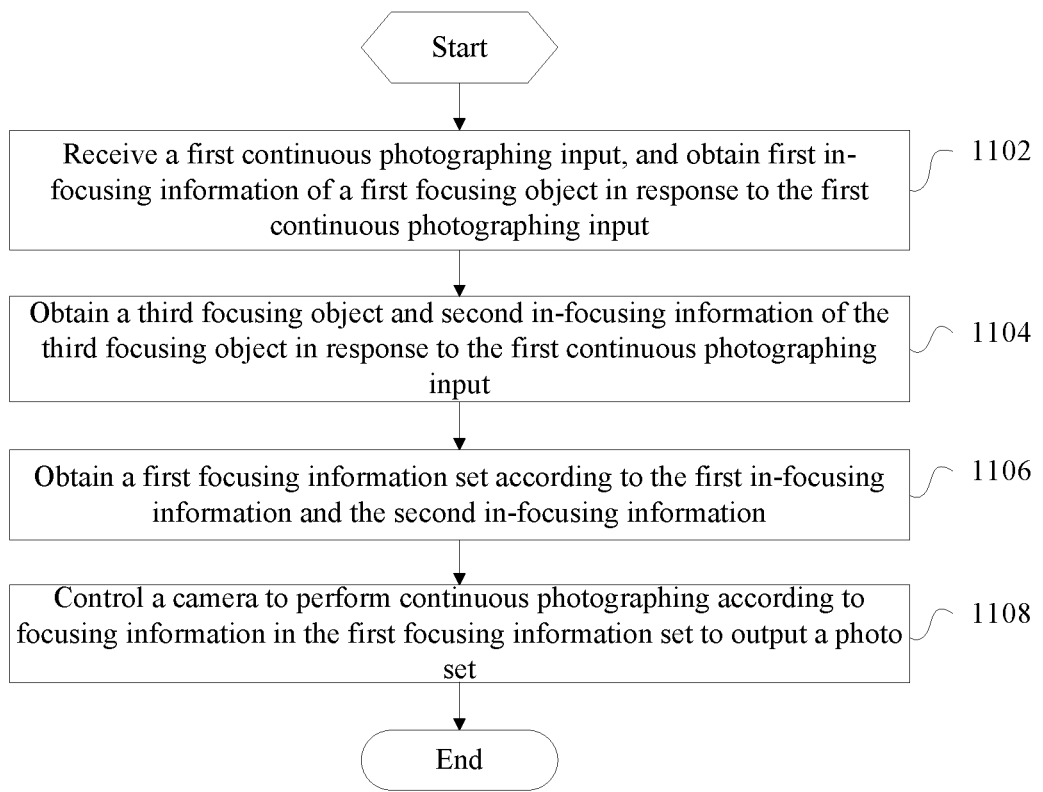
FIG. 11 is a seventh flowchart of a photographing processing method according to an embodiment of this application.

In some embodiments of this application, FIG. 11 is a seventh flowchart of a photographing processing method according to an embodiment of this application. Specifically, after the selecting a first focusing object, the photographing processing method may further include the following steps:

Step 1102: Receive a first continuous photographing input.

Step 1103: Obtain first in-focusing information of the first focusing object in response to the first continuous photographing input, where the third focusing object is selected through the first continuous photographing input.

Step 1104: Obtain a third focusing object and second in-focusing information of the third focusing object according to the first continuous photographing input.

Step 1106: Obtain a first focusing information set according to the first in-focusing information and the second in-focusing information.

Step 1108: Control a camera to perform continuous photographing according to focusing information in the first focusing information set to output a photo set.

The third focusing object is selected through the first continuous photographing input.

In this embodiment of this application, multi-target continuous photographing may be performed through continuous focusing. Specifically, the mobile photographing device enters a continuous photographing mode according to the first continuous photographing input performed by the user. In the continuous photographing mode, first, the first in-focusing information corresponding to the first focusing object is determined.

The first focusing object may be determined by using the photographing processing method provided in any one of the foregoing embodiments. Automatic focus is performed on the first focusing object in the focusing region, and accurate focal length information of the first focusing object is obtained through manual focal length adjustment or the second time of automatic focus, and the first in-focusing information is obtained after the user taps "Determine" or "Shoot".

In addition, according to the first continuous photographing input, the mobile photographing device further determines the third focusing object in the focusing region selected by the user. The third focusing object may be another target that is completely different from the first focusing object, or may be another part or a region on the first focusing object.

After the third focusing object is determined, accurate focal length information of the third focusing object may be obtained in a same focusing determining manner, and the second in-focusing information is obtained after the user taps "Determine" or "Shoot".

Further, the first focusing information set is formed by using the first in-focusing information as a start point and the second in-focusing information as an end point, and continuous photographing is successively performed according to a gradual change order from the first in-focusing information to the second in-focusing information.

Figure 12:
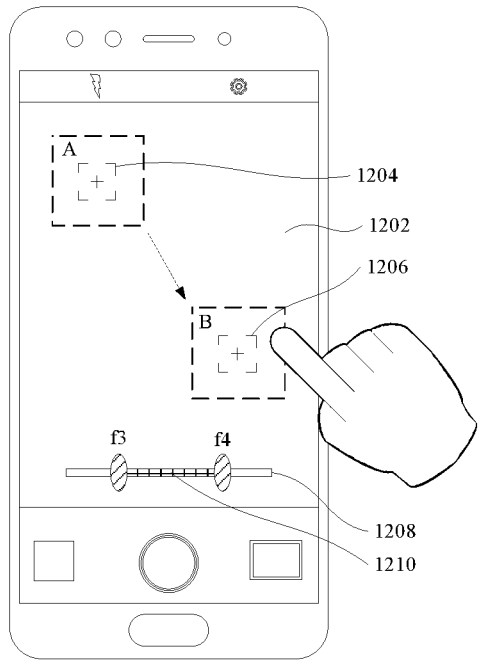
FIG. 12 is a fifth schematic diagram of a photographing interface according to an embodiment of this application.

Specifically, FIG. 12 is a fifth schematic diagram of a photographing interface according to an embodiment of this application. As shown in FIG. 12, after the first continuous photographing input is received, an object a in a focusing region A is photographed in a preview image 1202. In this case, an original focusing frame 1204 is located in the focusing region A. Then, in a manner of dragging the focusing frame, the focusing frame is dragged to a focusing region B, and an object b in the focusing region B is photographed. In this case, a current focusing frame 1206 is located in the focusing region B.

When focusing is performed on the object a, an accurate focal length of the object a is determined as f3. When focusing is performed on the object b, an accurate focal length of the object b is determined as f4. In this case, f3 and f4 are marked on a focal length adjustment bar 1208, and a region 1210 between f3 and f4 is marked, where the region 1210 includes n pieces of focusing information f3-4.

For example, the user first performs automatic focus and focal length adjustment on the object a. After focusing is completed, the user taps the focusing frame and drags the focusing frame to the object b, and then releases the focusing frame to complete setting of a focusing interval of enclosed continuous focus photographing. In a process of dragging the focusing frame, the focusing interval is synchronously displayed on the focal length adjustment bar 1208.

When the user inputs the second photographing operation, photographing is separately performed by focusing information f3, f3-4×n, and f4 starting from the object a, to obtain a series of continuous photos.

In a continuous focusing manner, different focusing objects are continuously photographed, and a large number of focusing photos may be obtained in a short time for subsequent selection of the user, so that a plurality of targets corresponding to different focus segment information can be quickly captured at the same time, thereby improving a photo yield.

Figure 13:
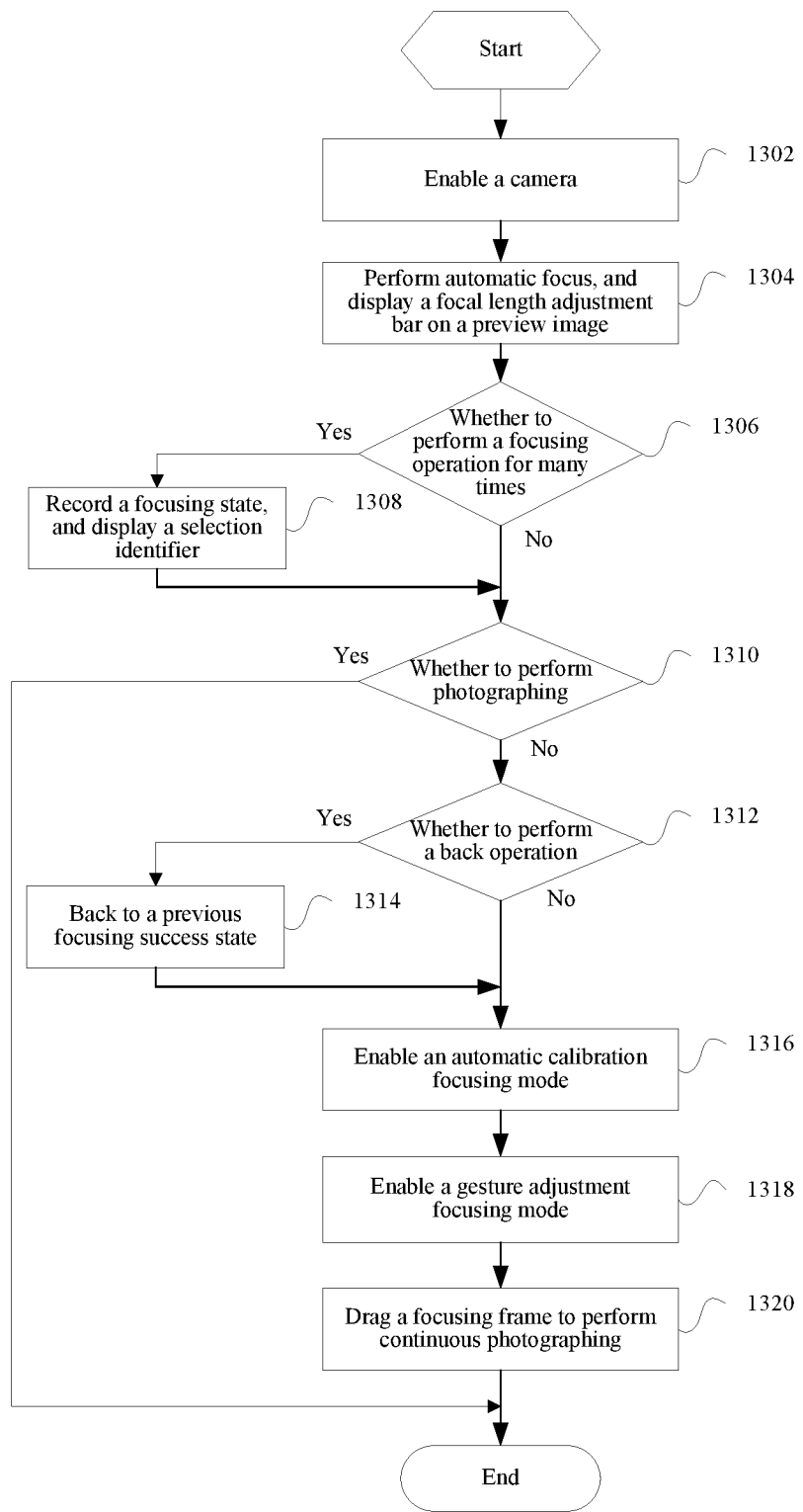
FIG. 13 is an eighth flowchart of a photographing processing method according to an embodiment of this application.

FIG. 13 is an eighth flowchart of a photographing processing method according to an embodiment of this application. Specifically, a complete photographing procedure is as follows:

Step 1302: Enable a camera.

Step 1304: Perform automatic focus, and display a focal length adjustment bar on a preview image.

Step 1306: Determine whether to perform a focusing operation for many times, and if yes, perform step 1308; otherwise, perform step 1310.

Step 1308: Record a focusing state, and display a selection identifier.

Step 1310: Determine whether to perform photographing, and if yes, end the procedure; otherwise, perform step 1312.

Step 1312: Determine whether to perform a back operation, and if yes, perform step 1314; otherwise, perform step 1316.

Step 1314: Back to a previous focusing success state.

Step 1316: Enable an automatic calibration focusing mode.

Step 1318: Enable a gesture adjustment focusing mode.

Step 1320: Drag a focusing frame to perform continuous photographing.

Specifically, for example, a user enables the camera, and taps the preview image to perform automatic focus. After focusing, a focus length adjustment bar for manual focus is displayed below the preview image to manually adjust a focus.

When the user prepares to focus, the user may perform calibration on an automatic focus effect. On the basis of automatic focus, the user performs automatic focus calibration by performing a double-tap operation on a focusing target. In this case, the focal length adjustment bar below is automatically adjusted.

For example, when a manual focus operation is not performed, a slider of the focal length adjustment bar is in an intermediate location by default, and after automatic focus is completed, the user may manually perform fine tuning on the focal length adjustment bar to obtain a best focusing state. If an automatic calibration operation is performed after automatic focus is completed, the focal length adjustment bar is automatically adjusted, a focusing state after fine tuning is changed, and corresponding calibration is performed, to achieve the best state as far as possible, thereby reducing a subsequent process in which manual adjustment needs to be performed.

A specific focusing parameter for calibration is obtained by means of calculation by fitting adjustment values corresponding to different focal lengths recorded in the past photographing. For example, when the user performs photographing many times in focal lengths f1 and f2, average manual adjustment values a1 and a2 of the use are separately calculated when the focal lengths are f1 and f2, and then curve fitting is performed to obtain a relationship curve between a focal length f ranging from f1 to f2 and a calibration adjustment value a. Finally, if the user performs automatic focus, the obtained focal length f is between f1 and f2, and a corresponding calibration adjustment value may be calculated according to the curve.

If the user performs a focusing operation many times, information about each time of focusing before photographing is trigged may be recorded.

After the user performs the focusing operation many times in a case that a focusing success rate is relatively low, a back key on the left side of a slide bar may be tapped to return to a state in which focusing is most accurate. In this case, the focusing frame turns green, thereby prompting the user that focusing data in the current scene is the most accurate.

A focusing region of the mobile terminal is usually fixed, a small rectangular size is fixed by using a point of a preview region tapped by a finger, and this region is used as the focusing region. This leads to a focusing error of some scenes. For example, a focusing object A is surrounded by other objects B and C, and A is farther from a lens than B and C. If A is tapped, the objects B and C may be focused. In this case, a manual focus slide bar may be tapped to quickly slide upward, and the gesture adjustment focusing region mode is enabled, so that the focusing frame turns green.

In this case, original preview image zoom is replaced with gesture zoom for adjusting the focusing region.

The user may zoom out the preview image by using two fingers, so that the focusing region can be reduced, and it is easier to focus those small objects, especially when there is another scene around the small object, so that a case that focusing of a fixed region simply leads to focusing of other scenes and a desired effect of the user is not achieved can be avoided.

By sliding and separating two fingers, the focusing region may be expanded, and relatively large objects may be more easily focused. For example, when multiple persons are photographed at a relatively close distance, if a rear person is relatively far, when the center of the screen is tapped for focusing, the rear person is blurred, and a desired focusing effect is not achieved. In this case, the focusing region is enlarged, all objects that need to be focused are covered, and then focusing is performed, to obtain a better photographing effect.

If the gesture adjustment focusing mode is to exit, for example, a border of the focusing frame may be tapped. After exiting, a color of the focusing frame is restored, such as from green to blue.

For the continuous photographing mode, the user may perform continuous focus photographing, for example, perform continuous focus photographing between an object A with a relatively large focal length and an object B with a relatively small focal length, so that a specific continuous focus photographing interval can be quickly set.

Specifically, first, the user performs automatic focus on the first object A. After the focusing is completed, the user taps the focusing frame, drags the focusing frame to another object B, and then releases the focusing frame to complete setting of an enclosed focusing interval of continuous focus photographing. When the focusing frame is dragged, the manual focus slide bar corresponds to the displayed continuous focus photographing interval. During continuous photographing, the user successively performs photographing according to focusing values in the focusing interval, to obtain a series of photo sets in which focusing states change, which are represented as a series of photos that have a blurring change, so as to be selected later.

In this embodiment of this application, based on automatic focus and manual focus, a problem that image quality degrades due to a deviation in automatic focus is resolved, and a focusing region is adjusted through automatic focus calibration and gesture, thereby improving focusing accuracy and improving a photographing effect of the user. On this basis, to prevent the user from being unable to select a best focusing point after multiple focusing, in this embodiment of this application, a focusing back policy is further used to store a current scenario and a best focusing distance of a focusing object. With reference to the enclosed continuous focus photographing policy, the specific continuous focus photographing interval may be quickly set by using a reference object, thereby further improving convenience of manual focus.

Figure 14:
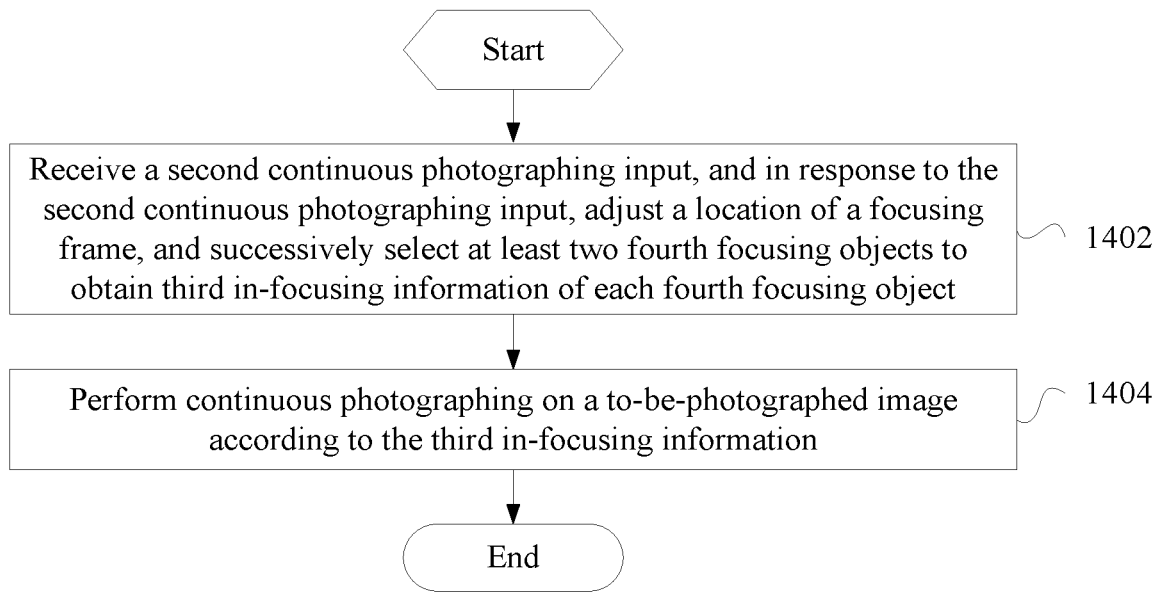
FIG. 14 is a ninth flowchart of a photographing processing method according to an embodiment of this application.

In some embodiments of this application, FIG. 14 is a ninth flowchart of a photographing processing method according to an embodiment of this application. Specifically, the photographing processing method may further include the following steps:

Step 1402: Receive a second continuous photographing input, and in response to the second continuous photographing input, adjust the location of the focusing frame, and successively select at least two fourth focusing objects to obtain third in-focusing information of each fourth focusing object.

Step 1404: Control the camera to perform continuous photographing according to the third in-focusing information.

In this embodiment of this application, the second continuous photographing input may be used to adjust the focusing region, a plurality of fourth focusing objects are selected at once, the plurality of fourth focusing objects are separately used as focusing objects according to a sequence of moving the focusing frame to perform continuous photographing, and finally a group of photos whose focal lengths change continuously are obtained, or one dynamic picture with a moving focus is obtained.

Figure 15A:
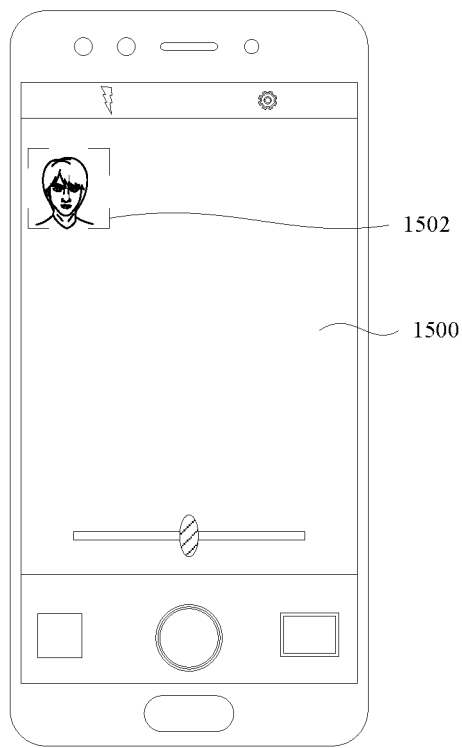
FIG. 15A is a sixth schematic diagram of a photographing interface according to an embodiment of this application.
Figure 15B:
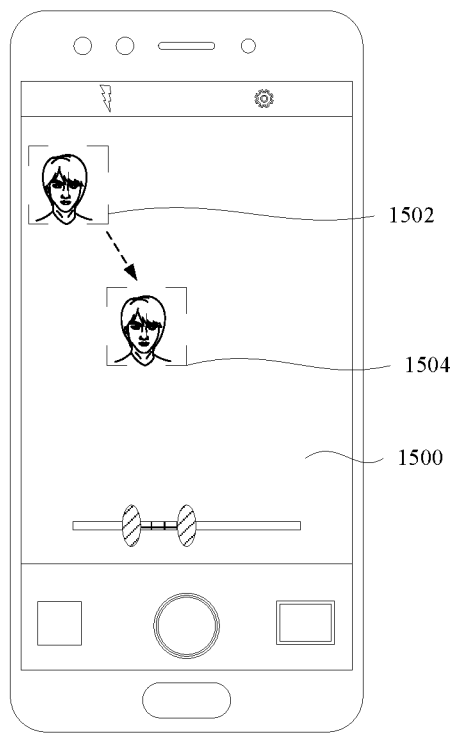
FIG. 15B is a seventh schematic diagram of a photographing interface according to an embodiment of this application.
Figure 15C:
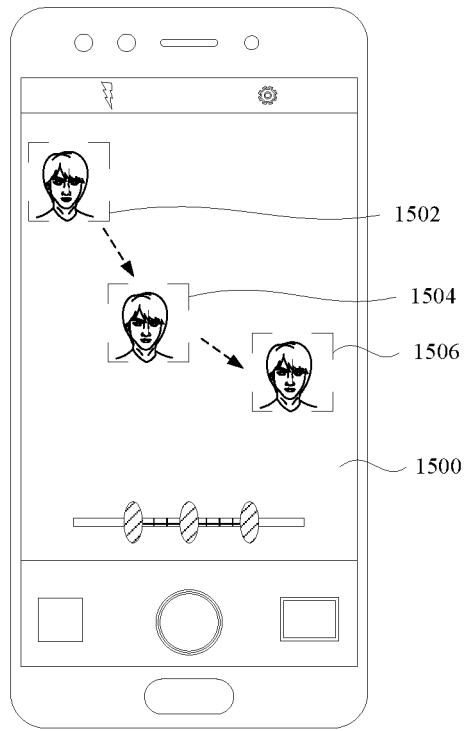
FIG. 15C is an eighth schematic diagram of a photographing interface according to an embodiment of this application.

Specifically, FIG. 15A is a sixth schematic diagram of a photographing interface according to an embodiment of this application, FIG. 15B is a seventh schematic diagram of a photographing interface according to an embodiment of this application, and FIG. 15C is an eighth schematic diagram of a photographing interface according to an embodiment of this application.

As shown in FIG. 15A, the user first selects the 1st fourth focusing object from the current preview image through automatic focus and manual adjustment, and then adjusts the focusing region by dragging the location of the focusing frame, so that the 2nd fourth focusing object is selected from the current image, and focusing is completed, as specifically shown in FIG. 15B.

Then, the user continues to drag the focusing frame, selects the 3rd fourth focusing object, and completes focusing until the user selects all fourth focusing objects. For example, the user finally selects three fourth focusing objects. In this case, the interface is shown in FIG. 15C.

In a preview image 1500, the 1st fourth focusing object corresponds to a scene frame 1502, the 2nd fourth focusing object corresponds to a scene frame 1504, and the 3rd fourth focusing object corresponds to a scene frame 1506.

After all the fourth focusing objects and the third in-focusing information corresponding to each fourth focusing object are determined, the plurality of fourth focusing objects are successively photographed according to a sequence in which the user drags the focusing frame, to complete continuous photographing.

Figure 16:
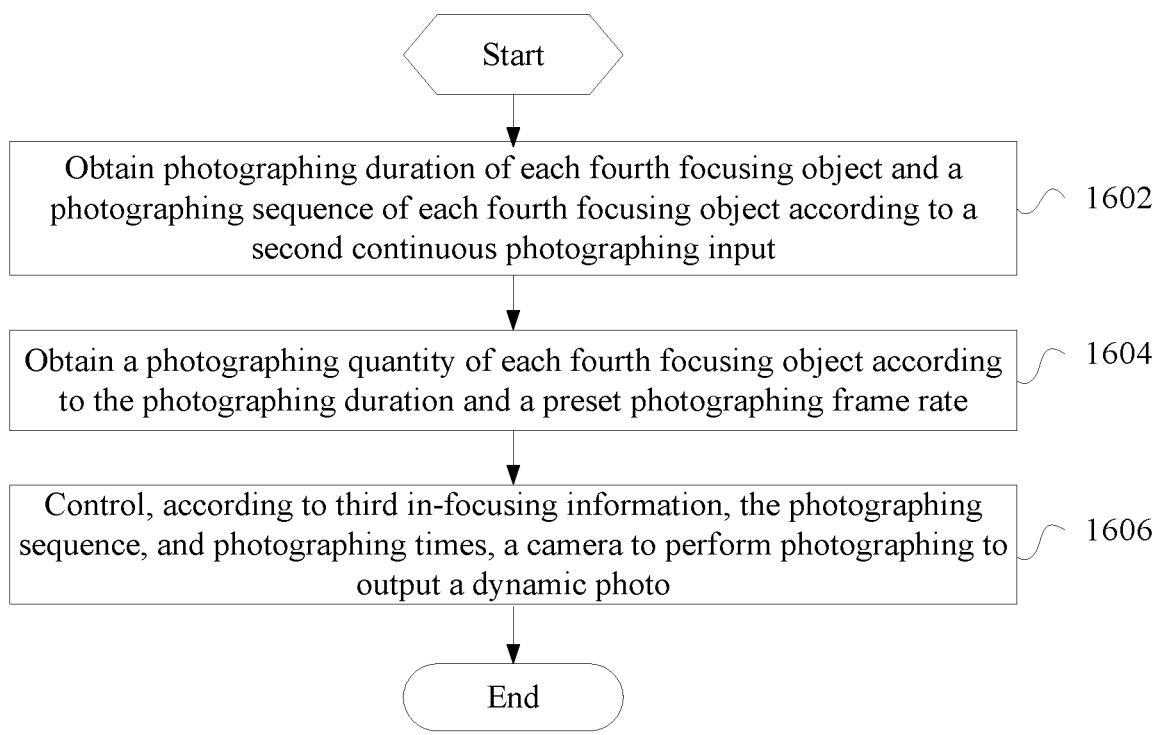
FIG. 16 is a tenth flowchart of a photographing processing method according to an embodiment of this application.

In some embodiments of this application, FIG. 16 is a tenth flowchart of a photographing processing method according to an embodiment of this application. Specifically, the controlling the camera to perform continuous photographing according to the third in-focusing information may include the following steps:

Step 1602: Obtain photographing duration of each fourth focusing object and a photographing sequence of each fourth focusing object according to the second continuous photographing input.

Step 1604: Obtain a photographing quantity of each fourth focusing object according to the photographing duration and a preset photographing frame rate.

Step 1606: Control, according to the third in-focusing information, the photographing sequence, and the photographing times, the camera to perform photographing to output a dynamic photo.

In this embodiment of this application, the photographing duration of each selected fourth focusing object is recorded, which is specifically duration in which a scene frame is dragged, and a sequence of selecting the plurality of fourth focusing objects is recorded.

A sequence of continuous photographing is determined according to the sequence of selecting the plurality of fourth focusing objects, and the photographing quantity of each fourth focusing object is determined according to the photographing duration and the preset photographing frame rate.

For example, a fourth focusing object A, a fourth focusing object B, and a fourth focusing object C are included, and are photographed according to a sequence of A-B-C. A process in which the user moves the scene frame from A to B lasts two seconds, and a process in which the user moves the scene frame from B to C lasts one second.

It is assumed that the preset photographing frame rate in the system is 25 frames per second, a total of 50 photos are photographed by the system when photographing starts from the fourth focusing object A to the object B. Focusing information of the 50 photos is a curve value of a gradual change from the third focusing information A corresponding to the fourth focusing object A to third in-focusing information corresponding to the fourth focusing object B through curve fitting.

Similarly, a total of 25 photos are photographed when continuous photographing is performed on the fourth focusing object B to the fourth focusing object C, and a dynamic photo whose total frames are 75 is finally integrated.

By separately performing focusing and photographing on a plurality of focusing objects according to a specific sequence, a dynamic photo whose focus varies with time is finally obtained, thereby implementing fun photographing of "dynamic zooming", and improving the fun of photographing.

In some embodiments of this application, the photographing processing method further includes: generating a focusing template based on the third in-focusing information, and storing the focusing template in preset storage space, where the preset storage space includes at least one focusing template; receiving a selection input on a target focusing template in the at least one focusing template; and controlling, according to the target focusing template in response to the selection input, the camera to perform photographing.

In this embodiment of this application, after continuous photographing is completed, focusing information of the current continuous photographing is stored, and a corresponding focusing template is formed. In a subsequent photographing process, the user may directly invoke the stored focusing template to perform fast continuous photographing.

The focusing template includes a focusing location, a focusing range, and focusing information, and the focusing information includes a focal segment parameter, a focal length parameter, and the like. After the user invokes the focusing template, the photographing device performs automatic photographing according to the same operation steps when storing the focusing template.

Figure 17:
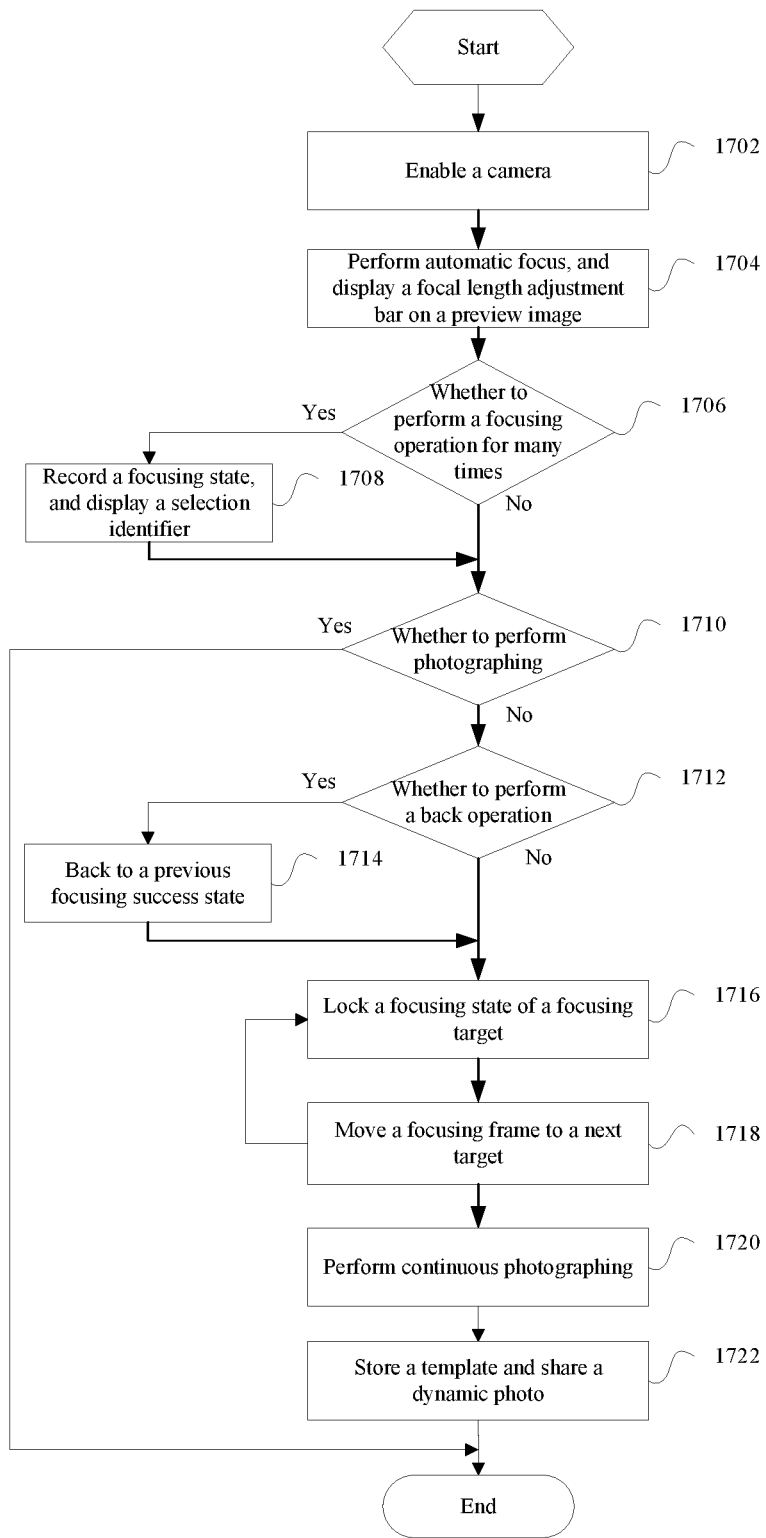
FIG. 17 is an eleventh flowchart of a photographing processing method according to an embodiment of this application.

FIG. 17 is an eleventh flowchart of a photographing processing method according to an embodiment of this application. Specifically, a complete photographing procedure is as follows:

Step 1702: Enable a camera.

Step 1704: Perform automatic focus, and display a focal length adjustment bar on a preview image.

Step 1706: Determine whether to perform a focusing operation for many times, and if yes, perform step 1708; otherwise, perform step 1710.

Step 1708: Record a focusing state, and display a selection identifier.

Step 1710: Determine whether to perform photographing, and if yes, end the procedure; otherwise, perform step 1712.

Step 1712: Determine whether to perform a back operation, and if yes, perform step 1714; otherwise, perform step 1716.

Step 1714: Back to a previous focusing success state.

Step 1716: Lock a focusing state of a focusing target.

Step 1718: Move a focusing frame to a next target, and return to step 1716 until all objects are selected, and perform step 1720.

Step 1720: Perform continuous photographing.

Step 1722: Store a template and share a dynamic photo.

Specifically, for example, a user enables the camera, and taps the preview image to perform automatic focus. After focusing, a focus length adjustment bar for manual focus is displayed below the preview image to manually adjust a focus.

For a continuous photographing mode, the user may tap an object A on the screen preview, and uses the object A as a start object of continuous focusing, to ensure focusing accuracy of the object A.

First, a size of the focusing frame is adjusted by zooming the focusing frame by using two fingers. A display size of the focusing frame represents a focusing region. After zooming, it is ensured that the focusing frame completely covers the object A.

Then, the focus length adjustment bar below is adjusted to perform fine tuning on a focusing value to ensure a best focusing distance. Fine tuning is continuously performed by using a back key, and a desired focusing state is confirmed by previewing clarity of the object A on the image and a blur degree of the background.

Finally, a double-tap operation is performed on the focusing frame to lock the current focusing state (a size and a focus length of the focusing region), which is stored as a focusing parameter of the start object A.

After the focusing state of the start object is confirmed, a focusing state of a next object is locked, the focusing frame is dragged to an object B, a time t1 in a dragging process is recorded, and a focusing state of the object B is locked. The focusing states in the entire process may be collected in the following several manners.

Arrangement: Different objects C, D, and E are successively selected in the foregoing manner, and a drag time t and corresponding focusing information f of each stage are recorded.

Combination: The focusing frame may be dragged to cover A and B to combine the objects A and B.

Finally, a series of focus locking states and drag times are obtained.

A photographing key is tapped to start photographing. First, a total time of the dynamic photo is T according to drag time values [t1, t2, and t3 . . . tn], where T is generally between 2 and 5 seconds, and may be set by the user. A photographing time length Tab of a focus change from t1 to t2 is obtained by multiplying a ratio of the drag time t1 to the total time T by T.

Then, photographing is performed starting from the object A according to the corresponding focusing lock state and by using a focusing parameter fa (a size and a focal length value of the focusing region) of the object A. For the next object B in the lock state, parameter values of fa and fb are compared, the focusing parameter are linearly modified from fa to fb according to the photographing time length Tab, and photographing is preformed according to a rate of 30 frames per second. In this process, a focusing change process from the object A to the object B is obtained.

Finally, after all focusing lock states are photographed in sequence, a dynamic photo with a blurring effect change and for which focusing is successively performed between the objects is synthesized, and previously specified focusing and object moving effects may be viewed by holding the dynamic photo.

After the photo is photographed, a long-press operation is performed on a photo thumbnail to store the current focusing lock state, and a focusing template for this photographing is obtained. When a long-press operation is performed on a screen next time to enter a continuous focusing process, the previous continuous focusing template may be selected, and the focusing template and an instance photo may be shared with a social network or other mobile phone terminals. The other terminals may directly shoot a desired dynamic photo by using the template when photographing.

In this embodiment of this application, with reference to automatic focus and manual focus, a photo of a dynamic focusing change can be photographed, and a photographing template corresponding to a photographing effect is generated for subsequent use, to provide a more convenient and interesting photographing scheme for focusing selection of the user in a multi-object photographing scene.

In some embodiments of this application, it should be noted that the photographing processing method provided in the embodiments of this application may be performed by a photographing processing apparatus, or a control module that is in the photographing processing apparatus and that is configured to perform the photographing processing method. In the embodiments of this application, that the photographing processing apparatus performs and loads the photographing processing method is used as an example to describe the photographing processing method provided in the embodiments of this application.

Figure 18:
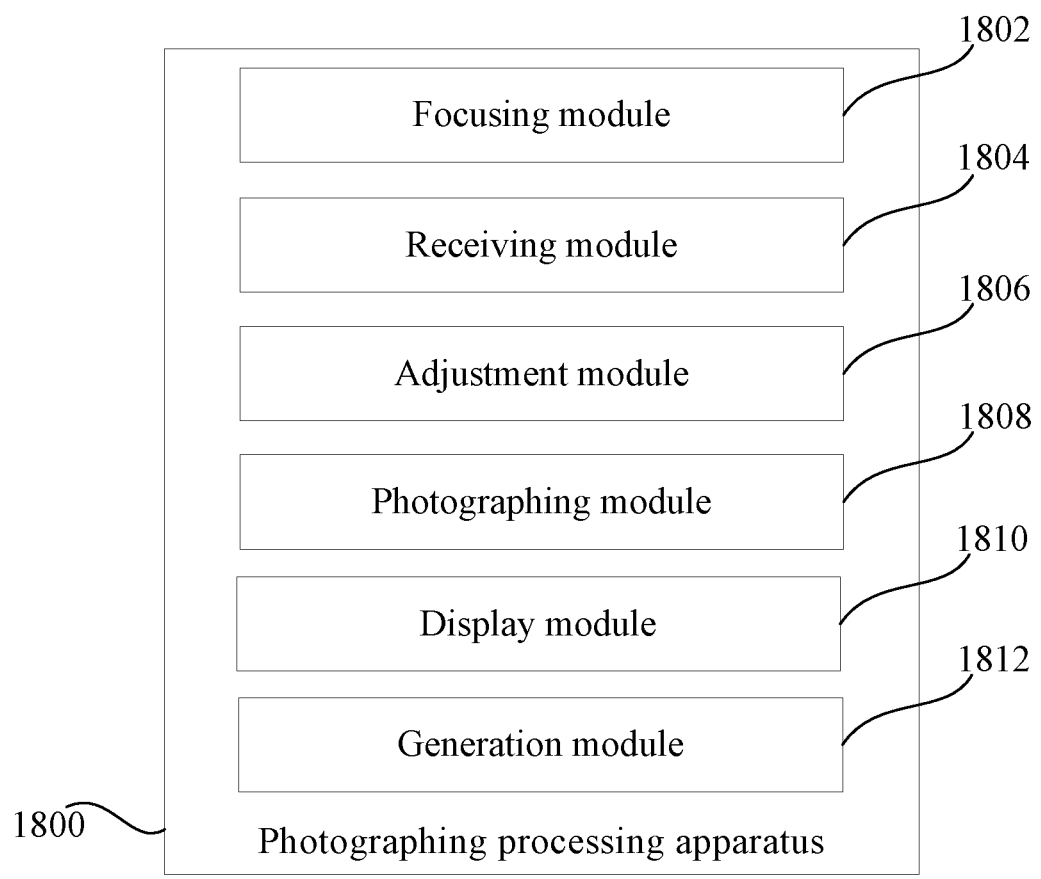
FIG. 18 is a structural block diagram of a photographing processing apparatus according to an embodiment of this application.

FIG. 18 is a structural block diagram of a photographing processing apparatus according to an embodiment of this application. Specifically, a photographing processing apparatus 1800 includes:

- a focusing module 1802, configured to: perform automatic focus on a first preview image displayed on a photographing preview interface, to obtain first focusing information, and update the first preview image to a second preview image corresponding to the first focusing information;
- a receiving module 1804, configured to receive a first input;
- an adjustment module 1806, configured to: in response to the first input, adjust the first focusing information to obtain second focusing information, and update the second preview image to a third preview image corresponding to the second focusing information; and
- a photographing module 1808, configured to perform photographing on the third preview image according to the second focusing information.

In this embodiment of this application, after a photographing mode is entered, automatic focus is first performed on the first preview image displayed on the photographing preview interface, to obtain the first focusing information through the automatic focus, and the preview image corresponding to the first focusing information is displayed.

The first focusing information includes a focus, a focus region, a focal section parameter, and a focal length parameter. In some implementations, the focusing information may further include an ISO (International Standardization Organization, sensitivity defined by International Standardization Organization) value, a white balance parameter, a contrast parameter, color space, and the like.

After the first focusing information of the automatic focus is obtained, if the user inputs the focusing adjustment operation, the first focusing information obtained through the automatic focus is adjusted according to the focusing adjustment operation, until a focusing effect meets a user's requirement. The adjusted second focusing information is obtained, and the preview image displayed based on the second focusing information is displayed, so that the user determines, in real time, whether the required focusing effect is achieved.

When the user determines that the current focusing effect meets the expectation, a mobile terminal may be controlled through a first photographing operation to perform photographing according to current focusing information to obtain a photo that meets the user's requirement.

In this embodiment of this application, automatic focus is performed first, and focal length information of a to-be-photographed object can be quickly obtained through the automatic focus, to meet a fast focusing requirement during photographing of a mobile end. In addition, the user is allowed to perform fine tuning based on the automatic focus through a focusing adjustment operation, to accurately obtain a focusing result desired by the user. In this way, not only a focusing speed is ensured, but also a focusing result can meet the user's requirement.

In some embodiments of this application, as shown in FIG. 18, the first input includes a first manual focus operation.

The adjustment module 1806 is further configured to: obtain a first focusing adjustment value according to the first manual focus operation; and adjust the first focusing information according to the first focusing adjustment value to obtain the second focusing information. In this embodiment of this application, when adjusting the first focusing information obtained through the automatic focus, the user may manually adjust the first focusing information by inputting the first manual focus operation.

Specifically, FIG. 3 is a first schematic diagram of a photographing interface according to an embodiment of this application. As shown in FIG. 3, for a photographing function of a mobile phone 300, after automatic focus succeeds, a focal length adjustment bar 304 and a slider 306 used to indicate a current focal length location are displayed on a preview interface 302.

After the automatic focus succeeds, an initial location of the slider 306 may be in a middle location of the focal length adjustment bar 304.

When the user feels that the result of the current automatic focus does not meet the requirement, the first manual focus operation may be input by touching and "dragging" the slider 306, where a direction of dragging the slider 306 corresponds to increasing or decreasing a focal length, that is, the first focusing adjustment value is positive or negative. A sliding di stance of dragging the slider 306 corresponds to a magnitude of the first focusing adjustment value. Finally, the first focusing information obtained through the automatic focus is adjusted according to the determined first focusing adjustment value, to obtain the second focusing information that can meet the user's requirement, and finally obtain a photo that satisfies the user.

This process is based on the almost correct focusing information obtained through the automatic focus, and the user performs manual adjustment. Therefore, focusing accuracy can be improved while ensuring the focusing speed.

In some embodiments of this application, as shown in FIG. 18, the first input further includes an automatic focus operation. The adjustment module 1806 is further configured to:
obtain historical adjustment data according to the automatic focus operation;
obtain a second focusing adjustment value corresponding to the first focusing information from the historical adjustment data; and
adjust the first focusing information according to the second focusing adjustment value to obtain the second focusing information.

In this embodiment of this application, when adjusting the first focusing information obtained through the automatic focus, the user may automatically adjust the first focusing information again by inputting the automatic focus operation.

Specifically, FIG. 5 is a second schematic diagram of a photographing interface according to an embodiment of this application. As shown in FIG. 5, for a photographing function of a mobile phone, after automatic focus succeeds, a focal length adjustment bar 504, a slider 506 used to indicate an original focal length location, and an automatic adjustment identifier 508 are displayed on a preview interface 502.

After the first time of automatic focus is completed, if the user is not satisfied with the current first focusing information, the automatic focus operation is input by touching the automatic adjustment identifier. In this case, a mobile photographing end obtains historical adjustment data, where the historical adjustment data includes final focusing adjustment data in each previous successful photographing operation process.

The mobile photographing end searches the historical adjustment data for a history record that matches the first focusing information of the current automatic focus result, determines the corresponding second focusing adjustment value, and automatically adjusts the first focusing information by using the second focusing adjustment value, to obtain the adjusted second focusing information for previewing by the user.

For example, when the user performs a plurality of times of photographing on a focal length f1 and a focal length f2, and separately calculates average focusing adjustment values a1 and a2 of manual focus adjustment by the user in the case of the focal length f1 and the focal length f2. Then, when a focal length is f between f1 and f2, a relationship between f and a corresponding adjustment value a is calculated through curve fitting, and the result of the automatic focus is adjusted by using the adjustment value a.

As shown in FIG. 5, after automatic adjustment, both the slider 506 indicating the original focal length location and the slider 510 indicating the current focal length location are displayed on the focal length adjustment bar 504.

It can be understood that if the user is still not satisfied with the adjusted preview image, the automatic focus operation may be repeatedly input, so that the mobile terminal continues to perform adjustment based on the current focusing information until a focusing result can be satisfied by the user.

The historical adjustment data may be local data, or may be big data obtained from a server. A source of the historical adjustment data is not limited in this embodiment of this application.

In some embodiments of this application, as shown in FIG. 18, the photographing processing apparatus 1800 further includes:
- a display module 1810, configured to display a selection identifier in a case that times of performing focusing adjustment operations is greater than a preset count threshold;
- the receiving module 1804 is further configured to receive a second input on the selection identifier; and
- the display module 1810 is further configured to display a fourth preview image corresponding to historical focusing information in response to the second input, where the historical focusing information is associated with the selection identifier.

In this embodiment of this application, after each focusing, if the device determines that the current focusing succeeds, current focusing data is recorded, and stored as historical focusing data. In addition, if the terminal determines that the user currently performs focusing adjustment operations many times, specifically, the obtained times of performing the focusing adjustment operation is greater than the preset count threshold, it is considered that accurate focusing is not implemented after the user adjusts focusing information. In this case, to help the user quickly find an accurate focusing segment, one selection identifier may be displayed. The user selects the selection identifier, so that the focusing can be returned to the historical focusing information, and the fourth preview image corresponding to the historical focusing information is displayed.

In an implementation, the historical focusing information includes a plurality of pieces of focusing information, and the selection identifier may include two page flip keys, which are respectively corresponding to one "previous" piece of historical focusing information and one "next" piece of historical focusing information. After pressing a page flip key "previous", the user selects one piece of historical focusing information of earlier time. After pressing a page flip key "next", the user selects one piece of historical focusing information of later time.

In another implementation, the historical focusing information may be historical focusing information obtained through automatic focus, that is, the first focusing information, and the selection identifier may be an identifier "Back". After triggering the identifier "Back", the user directly returns the historical focusing information obtained through automatic focus, that is, the first focusing information.

Specifically, FIG. 7 is a third schematic diagram of a photographing interface according to an embodiment of this application. As shown in FIG. 7, for a photographing function of a mobile phone, after automatic focus succeeds, a focal length adjustment bar 704, a slider 706 used to indicate an original focal length location, and a slider 708 used to indicate a current focal length location are displayed on a preview interface 702.

If a system determines that the user adjusts focusing information many times, a selection identifier 710 is displayed on a side of the focal length adjustment bar 704. When the user taps the selection identifier 710, current focusing information is returned to historical success focusing information of previous successful focusing.

The historical success focusing information is stored, and the user is allowed to replace the current focusing information with the historical success focusing information by touching the selection identifier. In this way, the user can be prevented from losing correct focusing due to misoperation, and focusing efficiency can be further improved.

In some embodiments of this application, as shown in FIG. 18, the receiving module 1804 is further configured to receive a third input.

The focusing module 1802 is further configured to: in response to the third input, select a focusing region from the first preview image in the current preview image, and select a first focusing object from the focusing region; and perform the automatic focus on the first focusing object to obtain the first focusing information of the first focusing object.

In this embodiment of this application, before photographing is performed, the user may manually or automatically select a focusing region from a current preview image through the third input. A photographing device may determine a central target according to the focusing region as a focusing target, that is, the first focusing object, and perform the automatic focus by using the first focusing object as a focus.

Specifically, after the user opens a photographing program and enters a photographing interface, a preview image is displayed on a display of a mobile photographing device in real time. The user may select a region from the preview image by tapping a region of the preview image, or in a "box select" manner, to input a first focusing operation. In this case, the mobile photographing device automatically determines one first focusing object in the focusing region as a focusing center target, and performs automatic focus on the first focusing object.

When the first focusing object in the focusing region is being identified, a target closest to a lens in the focusing region may be used as the first focusing object, a target that occupies a maximum area in the focusing region may be used as the first focusing object, or a target that has a maximum brightness in the focusing region may be used as the first focusing object. A method for identifying the first focusing object is not limited in this embodiment of this application.

In some embodiments of this application, as shown in FIG. 18, the display module 1810 is further configured to display a focusing frame in the focusing region.

The adjustment module 1806 is further configured to:
- receive a second manual focus input on the focusing frame;
- adjust a display parameter of the focusing frame in response to the second manual focus input, where the display parameter includes at least one of the following: a size and a location; and
- obtain third focusing information of a second focusing object through the automatic focus, where the second focusing object is an object selected by the focusing frame after the display parameter of the focusing region is adjusted.

In this embodiment of this application, after the user taps or selects the preview image and selects the focusing region from the current preview image, the focusing frame is displayed in the focusing region. The focusing frame may be a rectangular focusing frame, a circular focusing frame, or a focusing frame of an irregular geometric image. An appearance of the focusing frame is not limited in this embodiment of this application.

After the focusing frame is displayed, a second manual focus operation may be received by using the focusing frame, and a size or a location of the focusing region is adjusted, to determine a "larger" or "smaller" focusing region in the current preview image, or select another location of the current preview image as the focusing region.

After the focusing region changes, the mobile photographing device determines the second focusing object from the changed focusing region. The second focusing object may be a same object as the first focusing object, may be another object different from the first focusing object, or may be another part of the first focusing object.

Specifically, FIG. 10 is a fourth schematic diagram of a photographing interface according to an embodiment of this application. As shown in FIG. 10, after a user opens a photographing program and enters a photographing interface, a mobile phone displays a preview image in real time. The user may input the first focusing operation by tapping any region in a preview image 1002. In this case, a focusing frame 1006 is displayed in a focusing region 1004 that the user taps.

In this case, the user may drag a border portion of the focusing frame 1006 to input the second manual focus operation, and determine a new focusing region 1004 from the preview image 1002.

The user may further drag four corners of the focusing frame 1006 to input the second manual focus operation, or input the second manual focus operation by using a gesture operation such as two-finger extension, to adjust a size of the focusing region 1004.

Optionally, after the user inputs the second manual focus operation, a selection identifier key may further be displayed on the preview image 1002. After the user taps the selection identifier key, the focusing frame returns to an initial state before adjustment of the user.

For example, if a current focusing object A is surrounded by another object, and a distance between the focusing object A and a lens is farther than that from the foregoing another object, a case that a focal length drifts to other objects B and C may occur when the object A is focused. In this case, the focusing adjustment operation may be enabled in a manner of tapping a focusing slider and quickly sliding up.

In this case, a color of the focusing frame may change a display color, for example, changing from blue to green.

Therefore, the user may reduce the focusing region by pinching two fingers on the preview image, thereby implementing precise focusing on the object A. The focusing region may be expanded by separating two fingers, to encompass a larger focusing range. In this way, the user can freely select a focusing region and a focusing object, so that a photographing operation can be facilitated and focusing accuracy can be improved.

In some embodiments of this application, as shown in FIG. 18,
the receiving module 1804 is further configured to receive a first continuous photographing input; and
the photographing module 1808 is further configured to:
obtain first in-focusing information of the first focusing object and second in-focusing information of a third focusing object in response to the first continuous photographing input, where the third focusing object is selected through the first continuous photographing input;
obtain a first focusing information set according to the first in-focusing information and the second in-focusing information; and
control a camera to perform continuous photographing according to focusing information in the first focusing information set to output a photo set, where the third focusing object is selected through the first continuous photographing input.

In this embodiment of this application, multi-target continuous photographing may be performed through continuous focusing. Specifically, the mobile photographing device enters a continuous photographing mode according to the first continuous photographing input performed by the user. In the continuous photographing mode, first, the first in-focusing information corresponding to the first focusing object is determined.

The first focusing object may be determined by using the photographing processing method provided in any one of the foregoing embodiments. Automatic focus is performed on the first focusing object in the focusing region, and accurate focal length information of the first focusing object is obtained through manual focal length adjustment or the second time of automatic focus, and the first in-focusing information is obtained after the user taps "Determine" or "Shoot".

In addition, according to the first continuous photographing input, the mobile photographing device further determines the third focusing object in the focusing region selected by the user. The third focusing object may be another target that is completely different from the first focusing object, or may be another part or a region on the first focusing object.

After the third focusing object is determined, accurate focal length information of the third focusing object may be obtained in a same focusing determining manner, and the second in-focusing information is obtained after the user taps "Determine" or "Shoot".

Further, the first focusing information set is formed by using the first in-focusing information as a start point and the second in-focusing information as an end point, and continuous photographing is successively performed according to a gradual change order from the first in-focusing information to the second in-focusing information.

Specifically, FIG. 12 is a fifth schematic diagram of a photographing interface according to an embodiment of this application. As shown in FIG. 12, after the first continuous photographing input is received, an object a in a focusing region A is photographed in a preview image 1202. In this case, an original focusing frame 1204 is located in the focusing region A. Then, in a manner of dragging the focusing frame, the focusing frame is dragged to a focusing region B, and an object b in the focusing region B is photographed. In this case, a current focusing frame 1206 is located in the focusing region B.

When focusing is performed on the object a, an accurate focal length of the object a is determined as f3. When focusing is performed on the object b, an accurate focal length of the object b is determined as f4. In this case, f3 and f4 are marked on a focal length adjustment bar 1208, and a region 1210 between f3 and f4 is marked, where the region 1210 includes n pieces of focusing information f3-4.

For example, the user first performs automatic focus and focal length adjustment on the object a. After focusing is completed, the user taps the focusing frame and drags the focusing frame to the object b, and then releases the focusing frame to complete setting of a focusing interval of enclosed continuous focus photographing. In a process of dragging the focusing frame, the focusing interval is synchronously displayed on the focal length adjustment bar 1208.

When the user inputs the second photographing operation, photographing is separately performed by focusing information f3, f3-4×n, and f4 starting from the object a, to obtain a series of continuous photos.

In a continuous focusing manner, different focusing objects are continuously photographed, and a large number of focusing photos may be obtained in a short time for subsequent selection of the user, so that a plurality of targets corresponding to different focus segment information can be quickly captured at the same time, thereby improving a photo yield.

In some embodiments of this application, as shown in FIG. 18, the receiving module 1804 is further configured to receive a second continuous photographing input;
- the adjustment module 1806 is further configured to: in response to the second continuous photographing input, adjust the location of the focusing frame, and successively select at least two fourth focusing objects to obtain third in-focusing information of each fourth focusing object; and
- the photographing module 1808 is further configured to control the camera to perform continuous photographing according to the third in-focusing information.

In this embodiment of this application, the second continuous photographing input may be used to adjust the focusing region, a plurality of fourth focusing objects are selected at once, the plurality of fourth focusing objects are separately used as focusing objects according to a sequence of moving the focusing frame to perform continuous photographing, and finally a group of photos whose focal lengths change continuously are obtained, or one dynamic picture with a moving focus is obtained.

Specifically, FIG. 15A is a sixth schematic diagram of a photographing interface according to an embodiment of this application, FIG. 15B is a seventh schematic diagram of a photographing interface according to an embodiment of this application, and FIG. 15C is an eighth schematic diagram of a photographing interface according to an embodiment of this application.

As shown in FIG. 15A, the user first selects the 1st fourth focusing object from the current preview image through automatic focus and manual adjustment, and then adjusts the focusing region by dragging the location of the focusing frame, so that the 2nd fourth focusing object is selected from the current image, and focusing is completed, as specifically shown in FIG. 15B.

Then, the user continues to drag the focusing frame, selects the 3rd fourth focusing object, and completes focusing until the user selects all fourth focusing objects. For example, the user finally selects three fourth focusing objects. In this case, the interface is shown in FIG. 15C.

In a preview image 1500, the 1st fourth focusing object corresponds to a scene frame 1502, the 2nd fourth focusing object corresponds to a scene frame 1504, and the 3rd fourth focusing object corresponds to a scene frame 1506.

After all the fourth focusing objects and the third in-focusing information corresponding to each fourth focusing object are determined, the plurality of fourth focusing objects are successively photographed according to a sequence in which the user drags the focusing frame, to complete continuous photographing.

In some embodiments of this application, as shown in FIG. 18, the photographing module 1808 is further configured to:
- obtain photographing duration of each fourth focusing object and a photographing sequence of each fourth focusing object according to the second continuous photographing input;
- obtain photographing times corresponding to each fourth focusing object according to the photographing duration and a preset photographing frame rate; and
- control, according to the third in-focusing information, the photographing sequence, and the photographing times, the camera to perform photographing to output a dynamic photo.

In this embodiment of this application, the photographing duration of each selected fourth focusing object is recorded, which is specifically duration in which a scene frame is dragged, and a sequence of selecting the plurality of fourth focusing objects is recorded.

A sequence of continuous photographing is determined according to the sequence of selecting the plurality of fourth focusing objects, and the photographing quantity of each fourth focusing object is determined according to the photographing duration and the preset photographing frame rate.

For example, a fourth focusing object A, a fourth focusing object B, and a fourth focusing object C are included, and are photographed according to a sequence of A-B-C. A process in which the user moves the scene frame from A to B lasts two seconds, and a process in which the user moves the scene frame from B to C lasts one second.

It is assumed that the preset photographing frame rate in the system is 25 frames per second, a total of 50 photos are photographed by the system when photographing starts from the fourth focusing object A to the object B. Focusing information of the 50 photos is third in-focusing information A corresponding to the fourth focusing object A, and gradually changes to a curve value of third in-focusing information corresponding to the fourth focusing object B in a curve fitting manner.

Similarly, a total of 25 photos are photographed when continuous photographing is performed on the fourth focusing object B to the fourth focusing object C, and a dynamic photo whose total frames are 75 is finally integrated.

By separately performing focusing and photographing on a plurality of focusing objects according to a specific sequence, a dynamic photo whose focus varies with time is finally obtained, thereby implementing fun photographing of "dynamic zooming", and improving the fun of photographing.

In some embodiments of this application, as shown in FIG. 18, the photographing processing apparatus 1800 further includes:
- a generation module 1812, configured to: generate a focusing template based on the third in-focusing information, and store the focusing template in preset storage space, where the preset storage space includes at least one focusing template; where
- the receiving module 1804 is further configured to receive a selection input on a target focusing template in the at least one focusing template; and
- the photographing module 1808 is further configured to control, according to the target focusing template in response to the selection input, the camera to perform photographing.

In this embodiment of this application, after continuous photographing is completed, focusing information of the current continuous photographing is stored, and a corresponding focusing template is formed. In a subsequent photographing process, the user may directly invoke the stored focusing template to perform fast continuous photographing.

The focusing template includes a focusing location, a focusing range, and focusing information, and the focusing information includes a focal segment parameter, a focal length parameter, and the like. After the user invokes the focusing template, the photographing device performs automatic photographing according to the same operation steps when storing the focusing template.

In this embodiment of this application, with reference to automatic focus and manual focus, a photo of a dynamic focusing change can be photographed, and a photographing template corresponding to a photographing effect is generated for subsequent use, to provide a more convenient and interesting photographing scheme for focusing selection of the user in a multi-object photographing scene.

The photographing processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The photographing processing apparatus in this embodiment of this application may be an apparatus with an operating system. The operating system may be an Android operating system, an iOS operating system, or another possible operating system. This is not specifically limited in this embodiment of this application.

The photographing processing apparatus provided in this embodiment of this application can implement the processes implemented by the photographing processing apparatus in the method embodiments in FIG. 1 to FIG. 17. To avoid repetition, details are not described herein again.

An embodiment of this application further provides an electronic device, configured to perform the processes of the foregoing photographing processing method embodiment, and a same technical effect can be achieved. To avoid repetition, details are not described herein again.

Optionally, an embodiment of this application further provides an electronic device 1900, including a processor 1910, a memory 1909, and a program or an instruction that is stored in the memory 1909 and that can be run on the processor 1910. The program or the instruction is executed by the processor 1910 to implement the processes of the foregoing photographing processing method embodiment and a same technical effect can be achieved. To avoid repetition, details are not described herein again.

It should be noted that the electronic device in this embodiment of this application includes the foregoing mobile electronic device and the foregoing non-mobile electronic device.

Figure 19:
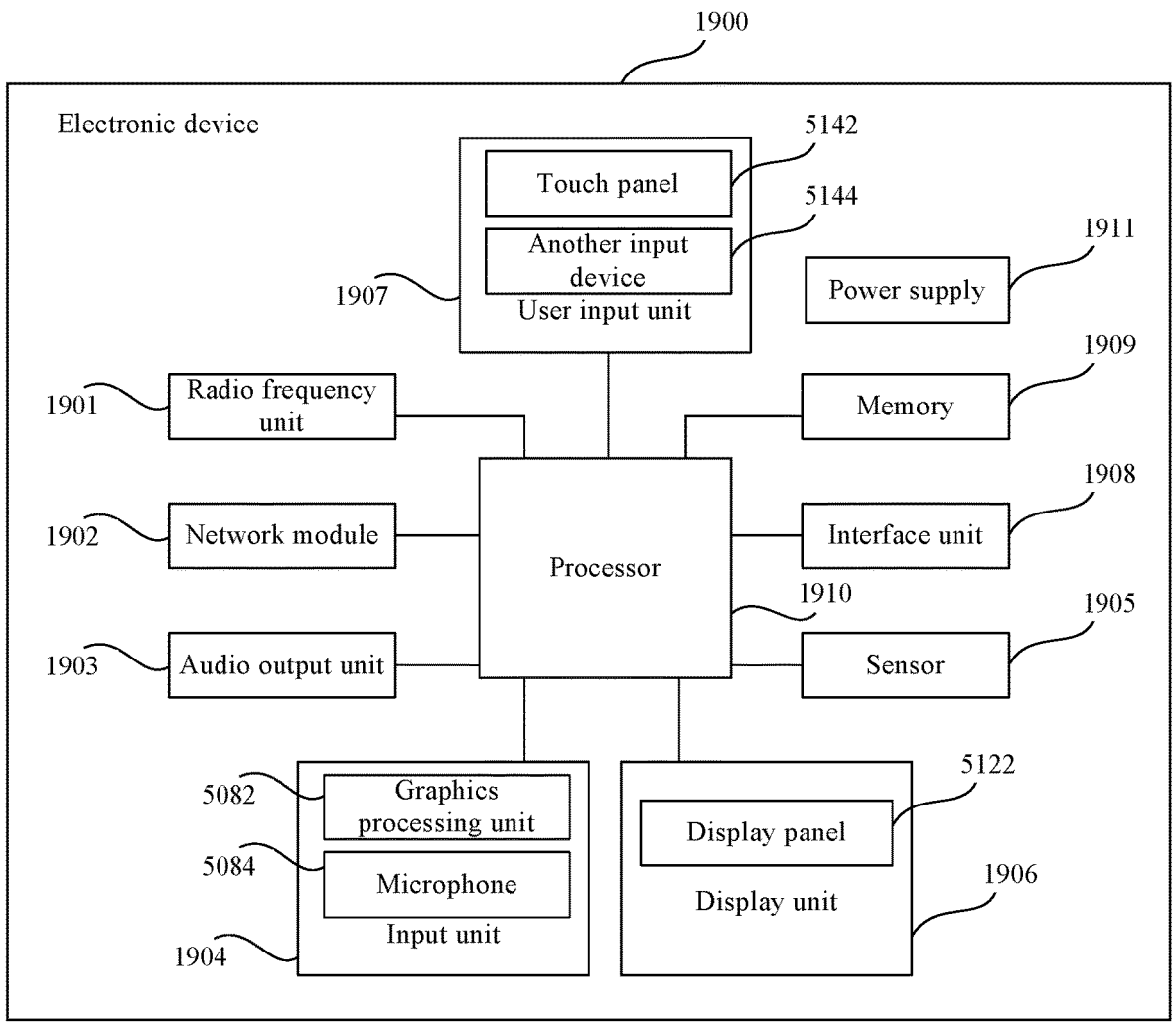
FIG. 19 is a schematic structural diagram of hardware of an electronic device according to an embodiment of this application.

FIG. 19 is a schematic structural diagram of hardware of an electronic device according to an embodiment of this application.

An electronic device 1900 includes but is not limited to components such as a radio frequency unit 1901, a network module 1902, an audio output unit 1903, an input unit 1904, a sensor 1905, a display unit 1906, a user input unit 1907, an interface unit 1908, a memory 1909, and a processor 1910.

A person skilled in the art can understand that the electronic device 1900 may further include a power supply 1911 (such as a battery) that supplies power to each component. The power supply 1911 may be logically connected to the processor 1910 by using a power supply management system, to implement functions such as charging and discharging management, and power consumption management by using the power supply management system. The structure of the electronic device shown in FIG. 19 does not constitute a limitation on the electronic device. The electronic device may include components more or fewer than those shown in the diagram, a combination of some components, or different component arrangements. Details are not described herein.

The processor 1910 is configured to: perform automatic focus on a first preview image displayed on a photographing preview interface, to obtain first focusing information, and update the first preview image to a second preview image corresponding to the first focusing information; receive a first input; in response to the first input, adjust the first focusing information to obtain second focusing information, and update the second preview image to a third preview image corresponding to the second focusing information; and perform photographing on the third preview image according to the second focusing information.

Specifically, the processor 1910 is further configured to: perform automatic focus on the first preview image displayed on the photographing preview interface, to obtain the first focusing information;

receive the first input, and adjust the first focusing information to obtain the corresponding second focusing information;

display a preview image corresponding to the first focusing information and display a preview image corresponding to the second focusing information; and control, according to the second focusing information, a camera to perform photographing.

The processor 1910 is further configured to: obtain a first focusing adjustment value according to the first manual focus operation, and adjust the first focusing information according to the first focusing adjustment value to obtain the second focusing information.

When adjusting the first focusing information obtained through the automatic focus, the user may manually adjust the first focusing information by inputting the first manual focus operation.

Historical adjustment data is obtained according to the automatic focus operation; a second focusing adjustment value corresponding to the first focusing information is obtained from the historical adjustment data; and the first focusing information is adjusted according to the second focusing adjustment value to obtain the second focusing information.

A selection identifier is displayed in a case that times of performing focusing adjustment operations is greater than a preset count threshold; and a second operation on the selection identifier is received, and a preview image corresponding to historical focusing information is displayed. The historical focusing information is associated with the selection identifier.

A third input is received, a focusing region is selected from the first preview image in the current preview image, and a first focusing object is selected from the focusing region; and the automatic focus is performed on the first focusing object to obtain the first focusing information corresponding to the first focusing object.

A focusing frame is displayed in the focusing region;

a second manual focus operation on the focusing frame is received, and a size and/or a location of the focusing region are/is adjusted; and third focusing information corresponding to a second focusing object is obtained through the automatic focus.

The second focusing object is an object selected by the focusing frame after the size and/or the location of the focusing region are/is adjusted.

A first continuous photographing input is received, and first in-focusing information of the first focusing object is obtained in response to the first continuous photographing input, where the third focusing object is selected through the first continuous photographing input; a third focusing object and second in-focusing information of the third focusing object are obtained according to the first continuous photographing input; a first focusing information set is obtained according to the first in-focusing information and the second in-focusing information; and a camera is controlled to perform continuous photographing according to focusing information in the first focusing information set to output a photo set, where the third focusing object is selected through the first continuous photographing input.

A second continuous photographing input is received, the location of the focusing frame is adjusted, and at least two fourth focusing objects are successively selected to obtain third in-focusing information of each fourth focusing object;

the camera is controlled to perform continuous photographing according to the third in-focusing information; and Photographing duration of each fourth focusing object and a photographing sequence of each fourth focusing object are obtained according to the second continuous photographing input; a photographing quantity of each fourth focusing object is obtained according to the photographing duration and a preset photographing frame rate; and the camera is controlled, according to the third in-focusing information, the photographing sequence, and the photographing times, to perform photographing to output a dynamic photo.

A focusing template is generated based on the third in-focusing information, the focusing template is stored in a database, a selection input on any focusing template in the database is received, and the camera is controlled, according to the selected focusing template, to perform photographing.

It should be understood that, in this embodiment of this application, the radio frequency unit 1901 may be configured to receive and send information or a signal in a call process. Specifically, the radio frequency unit 1901 receives downlink data of a base station or sends uplink data to a base station. The radio frequency unit 1901 includes but is not limited to an antenna, at least one amplifier, a transceiver, a coupler, a low noise amplifier, a duplexer, and the like.

The network module 1902 provides wireless broadband Internet access for the user, for example, helping the user to send and receive an e-mail, brows a web page, and access streaming media.

The audio output unit 1903 may convert audio data received by the radio frequency unit 1901 or the network module 1902 or stored in the memory 1909 into an audio signal and output the audio signal as a sound. In addition, the audio output unit 1903 may further provide an audio output (for example, a call signal received voice, or a message received voice) related to a specific function implemented by the electronic device 1900. The audio output unit 1903 includes a speaker, a buzzer, a telephone receiver, and the like.

The input unit 1904 is configured to receive an audio signal or a video signal. The input unit 1904 may include a graphics processing unit (GPU) 5082 and a microphone 5084, and the graphics processing unit 5082 processes image data of a still picture or video obtained by an image capture apparatus (such as a camera) in a video capture mode or an image capture mode. A processed image frame may be displayed on the display unit 1906, or stored in the memory 1909 (or another storage medium), or sent by using the radio frequency unit 1901 or the network module 1902. The microphone 5084 may receive a sound, and can process the sound into audio data. Processed audio data may be converted, in a call mode, into a format that can be sent to a mobile communication base station by using the radio frequency unit 1901 for output.

The electronic device 1900 further includes at least one sensor 1905, such as a fingerprint sensor, a pressure sensor, an iris sensor, a molecular sensor, a gyroscope, a barometer, a hygrometer, a thermometer, an infrared sensor, an optical sensor, a motion sensor, and another sensor.

The display unit 1906 is configured to display information entered by a user or information provided for a user. The display unit 1906 may include a display panel 5122. Optionally, the display panel 5122 may be configured in a form such as a liquid crystal display or an organic light-emitting diode.

The user input unit 1907 may be configured to: receive entered digital or character information, and generate key signal input related to a user setting and function control of the electronic device. Specifically, the user input unit 1907 includes a touch panel 5142 and another input device 5144. The touch panel 5142 is also referred to as a touchscreen, and may collect a touch operation performed by a user on or near the touch panel 5142. The touch panel 5142 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 1910, and can receive and execute a command sent by the processor 1910. The another input device 5144 may include but is not limited to a physical keyboard, a functional button (such as a volume control button or a power on/off button), a trackball, a mouse, and a joystick. Details are not described herein.

Further, the touch panel 5142 may cover the display panel 5122. When detecting the touch operation on or near the touch panel 5142, the touch panel 5142 transmits the touch operation to the processor 1910 to determine a type of a touch event, and then the processor 1910 provides corresponding visual output on the display panel 5122 based on the type of the touch event. The touch panel 5142 and the display panel 5122 may be used as two independent components, or may be integrated into one component.

The interface unit 1908 is an interface for connecting an external apparatus with the electronic device 1900. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1908 may be configured to receive input (for example, data information and power) from an external apparatus and transmit the received input to one or more elements in the electronic device 1900 or may be configured to transmit data between the electronic device 1900 and an external apparatus.

The memory 1909 may be configured to store a software program and various data. The memory 1909 may mainly include a program storage region and a data storage region. The program storage region may store an operating system, an application required by at least one function (such as a sound playing function or an image playing function), and the like. The data storage region may store data (such as audio data or a phone book) created according to use of the mobile terminal, and the like. In addition, the memory 1909 may include a high-speed random access memory, and may further include a nonvolatile memory, for example, at least one magnetic disk storage device, a flash storage device, or another volatile solid-state storage device.

The processor 1910 is configured to implement various functions of the electronic device 1900 and data processing by running or executing the software program and/or the module stored in the memory 1909 and by invoking the data stored in the memory 1909, to perform overall monitoring on the electronic device 1900. The processor 1910 may include one or more processing units. Preferably, an application processor and a modem processor may be integrated into the processor 1910. The application processor mainly processes an operating system, a user interface, an application, and the like. The modem processor mainly processes wireless communications.

The electronic device 1900 may further include the power supply 1911 that supplies power to each component. Preferably, the power supply 1911 may be logically connected to the processor 1910 by using a power supply management system, so as to implement functions such as charging management, discharging management, and power consumption management by using the power supply management system.

In this embodiment of this application, backscatter transmission may be enabled or stopped in time domain, channel estimation is performed on an interference signal by using a time segment in which backscatter transmission is stopped, and interference cancellation is performed in a next backscatter transmission time period by using a result of the channel estimation. Channel information of the interference signal may be obtained. During backscatter transmission, cancellation of the interference signal can improve transmission reliability, thereby improving a transmission throughput, and significantly improving communication quality.

An embodiment of this application further provides a readable storage medium. The readable storage medium stores a program or an instruction, and the program or the instruction is executed by a processor to implement the processes of the foregoing photographing processing method embodiment and a same technical effect can be achieved. To avoid repetition, details are not described herein again.

The processor is the processor in the electronic device in the foregoing embodiment. The readable storage medium includes a non-transitory computer-readable storage medium such as a computer-readable storage medium, such as a computer read-only memory (ROM), a random access memory (RAM), a magnetic disk, or an optical disc.

An embodiment of this application further provides a computer program product. The computer program product may be executed by a processor to implement the processes of the foregoing photographing processing method embodiment, and a same technical effect can be achieved. To avoid repetition, details are not described herein again.

An embodiment of this application further provides a chip. The chip includes a processor and a communications interface, the communications interface is coupled to the processor, and the processor is configured to run a program or an instruction to implement the processes of the foregoing photographing processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods provided in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A photographing processing method, comprising:
  performing automatic focus on a first preview image displayed on a photographing preview interface, to obtain first focusing information, and updating the first preview image to a second preview image corresponding to the first focusing information;
  receiving a first input;
  in response to the first input, adjusting the first focusing information to obtain second focusing information, and updating the second preview image to a third preview image corresponding to the second focusing information; and
  performing photographing on the third preview image according to the second focusing information;
  wherein the method further comprises:

displaying a selection identifier in a case that times of performing focusing adjustment operations is greater than a preset count threshold;

receiving a second input on the selection identifier; and displaying a fourth preview image corresponding to historical focusing information in response to the second input, wherein the historical focusing information is associated with the selection identifier.

2. The photographing processing method according to claim 1, wherein the first input comprises a first manual focus operation; and the adjusting the first focusing information comprises:

obtaining a first focusing adjustment value according to the first manual focus operation; and adjusting the first focusing information according to the first focusing adjustment value to obtain the second focusing information.

3. The photographing processing method according to claim 1, wherein the first input further comprises an automatic focus operation; and the adjusting the first focusing information comprises:

obtaining historical adjustment data according to the automatic focus operation;

obtaining a second focusing adjustment value corresponding to the first focusing information from the historical adjustment data; and adjusting the first focusing information according to the second focusing adjustment value to obtain the second focusing information.

4. The photographing processing method according to claim 1, wherein before the performing automatic focus on a first preview image displayed on a photographing preview interface, the photographing processing method further comprises:

receiving a third input; and in response to the third input, selecting a focusing region from the first preview image, and selecting a first focusing object from the focusing region; and the performing automatic focus on a first preview image displayed on a photographing preview interface comprises:

performing the automatic focus on the first focusing object to obtain the first focusing information of the first focusing object.

5. The photographing processing method according to claim 4, wherein after the receiving a third input, the photographing processing method further comprises:

displaying a focusing frame in the focusing region;

receiving a second manual focus input on the focusing frame;

adjusting a display parameter of the focusing frame in response to the second manual focus input, wherein the display parameter comprises at least one of the following: a size and a location; and obtaining third focusing information of a second focusing object through the automatic focus, wherein the second focusing object is an object selected by the focusing frame after the display parameter of the focusing frame is adjusted.

6. The photographing processing method according to claim 5, wherein after the selecting a first focusing object, the photographing processing method further comprises:

receiving a first continuous photographing input;

obtaining first in-focusing information of the first focusing object and second in-focusing information of a third focusing object in response to the first continuous photographing input, wherein the third focusing object is selected through the first continuous photographing input;

obtaining a first focusing information set according to the first in-focusing information and the second in-focusing information; and controlling a camera to perform continuous photographing according to focusing information in the first focusing information set to output a photo set.

7. The photographing processing method according to claim 6, further comprising:

receiving a second continuous photographing input;

in response to the second continuous photographing input, adjusting the location of the focusing frame, and successively selecting at least two fourth focusing objects to obtain third in-focusing information of each fourth focusing object; and controlling the camera to perform continuous photographing according to the third in-focusing information.

8. The photographing processing method according to claim 7, wherein the controlling the camera to perform continuous photographing according to the third in-focusing information comprises:

obtaining photographing duration of each fourth focusing object and a photographing sequence of each fourth focusing object according to the second continuous photographing input;

obtaining photographing times corresponding to each fourth focusing object according to the photographing duration and a preset photographing frame rate; and controlling, according to the third in-focusing information, the photographing sequence, and the photographing times, the camera to perform photographing to output a dynamic photo.

9. The photographing processing method according to claim 8, further comprising:

generating a focusing template based on the third in-focusing information, and storing the focusing template in preset storage space, wherein the preset storage space comprises at least one focusing template;

receiving a selection input on a target focusing template in the at least one focusing template; and controlling, according to the target focusing template in response to the selection input, the camera to perform photographing.

10. A photographing processing apparatus, comprising: a memory, a processor and a computer program stored in the memory and executable by the processor, wherein the processor executes the computer program to:

perform automatic focus on a first preview image displayed on a photographing preview interface, to obtain first focusing information, and update the first preview image to a second preview image corresponding to the first focusing information;

receive a first input;

in response to the first input, adjust the first focusing information to obtain second focusing information, and update the second preview image to a third preview image corresponding to the second focusing information; and perform photographing on the third preview image according to the second focusing information;

wherein the processor executes the computer program to:

display a selection identifier in a case that times of performing focusing adjustment operations is greater than a preset count threshold;

receive a second input on the selection identifier; and display a fourth preview image corresponding to historical focusing information in response to the second input, wherein the historical focusing information is associated with the selection identifier.

11. The photographing processing apparatus according to claim 10, wherein the first input comprises a first manual focus operation; and the processor executes the computer program to:
obtain a first focusing adjustment value according to the first manual focus operation; and
adjust the first focusing information according to the first focusing adjustment value to obtain the second focusing information.

12. The photographing processing apparatus according to claim 10, wherein the first input further comprises an automatic focus operation; and the processor executes the computer program to:
obtain historical adjustment data according to the automatic focus operation;
obtain a second focusing adjustment value corresponding to the first focusing information from the historical adjustment data; and
adjust the first focusing information according to the second focusing adjustment value to obtain the second focusing information.

13. The photographing processing apparatus according to claim 10, wherein the processor executes the computer program to:
receive a third input; and
in response to the third input, select a focusing region from the first preview image, and select a first focusing object from the focusing region; and
perform the automatic focus on the first focusing object to obtain the first focusing information of the first focusing object.

14. The photographing processing apparatus according to claim 13, wherein the processor executes the computer program to:
display a focusing frame in the focusing region; and
receive a second manual focus input on the focusing frame;
adjust a display parameter of the focusing frame in response to the second manual focus input, wherein the display parameter comprises at least one of the following: a size and a location; and
obtain third focusing information of a second focusing object through the automatic focus, wherein the second focusing object is an object selected by the focusing frame after the display parameter of the focusing frame is adjusted.

15. The photographing processing apparatus according to claim 14, wherein the processor executes the computer program to:
receive a first continuous photographing input; and
obtain first in-focusing information of the first focusing object and second in-focusing information of a third focusing object in response to the first continuous photographing input, wherein the third focusing object is selected through the first continuous photographing input;
obtain a first focusing information set according to the first in-focusing information and the second in-focusing information; and control a camera to perform continuous photographing according to focusing information in the first focusing information set to output a photo set.

16. The photographing processing apparatus according to claim 15, wherein the processor executes the computer program to:
receive a second continuous photographing input;
in response to the second continuous photographing input, adjust the location of the focusing frame, and successively select at least two fourth focusing objects to obtain third in-focusing information of each fourth focusing object; and
control the camera to perform continuous photographing according to the third in-focusing information.

17. The photographing processing apparatus according to claim 16, wherein the processor executes the computer program to:
obtain photographing duration of each fourth focusing object and a photographing sequence of each fourth focusing object according to the second continuous photographing input;
obtain photographing times corresponding to each fourth focusing object according to the photographing duration and a preset photographing frame rate; and
control, according to the third in-focusing information, the photographing sequence, and the photographing times, the camera to perform photographing to output a dynamic photo;
wherein the processor executes the computer program to:
generate a focusing template based on the third in-focusing information, and store the focusing template in preset storage space, wherein the preset storage space comprises at least one focusing template; wherein
receive a selection input on a target focusing template in the at least one focusing template; and
control, according to the target focusing template in response to the selection input, the camera to perform photographing.

18. A non-transient readable storage medium, wherein the readable storage medium stores a program or an instruction, a processor executes the computer program to:
perform automatic focus on a first preview image displayed on a photographing preview interface, to obtain first focusing information, and update the first preview image to a second preview image corresponding to the first focusing information;
receive a first input;
in response to the first input, adjust the first focusing information to obtain second focusing information, and update the second preview image to a third preview image corresponding to the second focusing information;
perform photographing on the third preview image according to the second focusing information;
display a selection identifier in a case that times of performing focusing adjustment operations is greater than a preset count threshold;
receive a second input on the selection identifier; and
display a fourth preview image corresponding to historical focusing information in response to the second input, wherein the historical focusing information is associated with the selection identifier.

* * * * *